US012599055B2

(12) United States Patent
    Stewart et al.

(10) Patent No.:    US 12,599,055 B2
(45) Date of Patent:        Apr. 14, 2026

(54) APPARATUS, SYSTEM AND METHOD FOR PLANTING

(71) Applicant: Skygrow Pty Ltd, Hamilton (NZ)

(72) Inventors: Mark Damien Stewart, Hamilton (NZ); Tobias Daniel Low, Hamilton (NZ)

( * ) Notice: Subject to any disclaimer, the term of this patent is extended or adjusted under 35 U.S.C. 154(b) by 893 days.

(21) Appl. No.: 17/595,373

(22) PCT Filed: May 15, 2020

(86) PCT No.: PCT/AU2020/050486

§ 371 (c)(1),
(2) Date: Nov. 15, 2021

(87) PCT Pub. No.: WO2020/227783

PCT Pub. Date: Nov. 19, 2020

(65) Prior Publication Data

US 2022/0240436 A1      Aug. 4, 2022

(30) Foreign Application Priority Data

May 15, 2019    (AU) ................................. 2019901651

(51) Int. Cl.
    *A01C 5/04*          (2006.01)
    *A01C 5/02*          (2006.01)
    *A01C 11/02*         (2006.01)
(52) U.S. Cl.
    CPC .................. *A01C 5/04* (2013.01); *A01C 5/02* (2013.01); *A01C 11/02* (2013.01)
(58) Field of Classification Search
    CPC ........... A01C 5/045; A01C 5/064; A01C 5/02; A01C 7/02; A01C 15/02; A01C 11/02; A01C 5/04

USPC .......................................... 111/114, 116, 107
See application file for complete search history.

(56)                References Cited

U.S. PATENT DOCUMENTS

|  |  |  |  |  |
|---|---|---|---|---|
| 133,849 | A | * | 12/1872 | Gilbert ..................... A01C 5/02 |
|  |  |  |  | 111/107 |
| 140,806 | A | * | 7/1873 | Bates ....................... A01C 5/02 |
|  |  |  |  | 111/116 |
| 2,865,315 | A | * | 12/1958 | Goldstein ................ A01C 5/02 |
|  |  |  |  | 111/95 |
| 3,191,982 | A | * | 6/1965 | Goalard .................. A01C 5/045 |
|  |  |  |  | 47/73 |
| 3,749,034 | A | * | 7/1973 | Bergius .................... A01C 5/02 |
|  |  |  |  | 111/92 |
| 3,797,417 | A | * | 3/1974 | Hahn ....................... A01C 5/02 |
|  |  |  |  | 111/92 |
| 3,894,589 | A | * | 7/1975 | Ciraud ................... A01G 17/16 |
|  |  |  |  | 52/165 |

(Continued)

FOREIGN PATENT DOCUMENTS

| GB | 2567277 B | 4/2019 |
|---|---|---|
| WO | 2017062749 A1 | 4/2017 |

*Primary Examiner* — Jamie L McGowan
(74) *Attorney, Agent, or Firm* — Oppenhuizen Law PLC; David L. Oppenhuizen

(57)                ABSTRACT

An apparatus for supporting a plant includes a growing compartment and a drill head. The drill head comprises a channel for receiving the plant and is operable to rotationally drill a hole. The drill head opens to release the plant into the hole. A drilling apparatus includes a frame supporting the drill head, a motor to rotate the drill head, and an actuator to displace the drill head.

18 Claims, 37 Drawing Sheets

(56)                References Cited

U.S. PATENT DOCUMENTS

| | | | | |
|---|---|---|---|---|
| 4,031,832 A * | 6/1977 | Edwards | A01C 11/006 | |
| | | | 47/73 | |
| 4,323,019 A * | 4/1982 | Haddock | A01C 5/02 | |
| | | | 111/116 | |
| 5,016,548 A * | 5/1991 | Ito | A01C 11/02 | |
| | | | 47/79 | |
| 5,133,269 A * | 7/1992 | Charneski | A01C 5/02 | |
| | | | 175/21 | |
| 5,469,923 A * | 11/1995 | Visser | A01B 1/165 | |
| | | | 294/50.6 | |
| 6,843,020 B2 * | 1/2005 | Lutz | A01G 29/00 | |
| | | | 111/94 | |
| D951,132 S * | 5/2022 | Johnson | D11/152 | |
| D957,216 S * | 7/2022 | Poutiainen | D8/1 | |
| 2017/0042079 A1 * | 2/2017 | Harris | E21B 11/005 | |
| 2021/0015028 A1 * | 1/2021 | Moiddin | A01C 11/006 | |

* cited by examiner

500

521

521

513

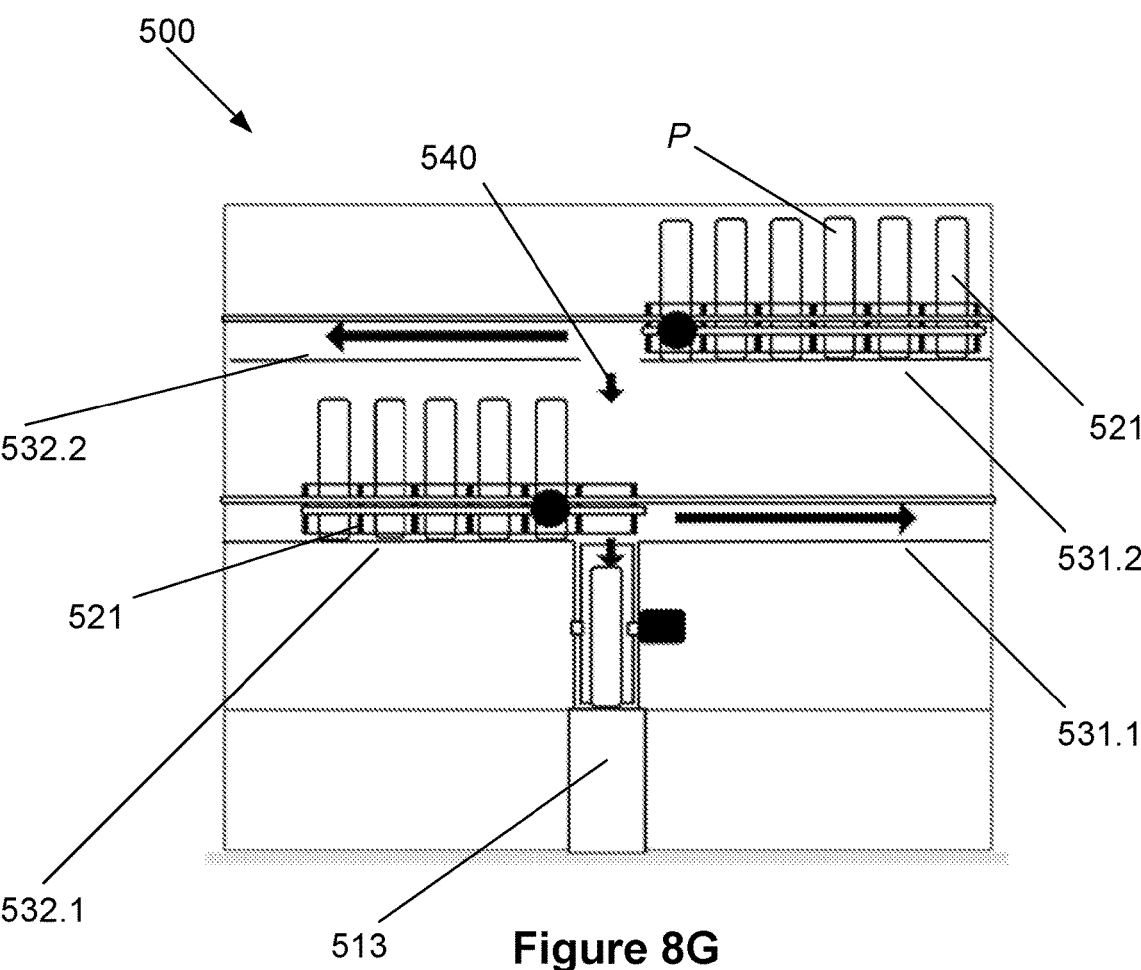
Figure 8G
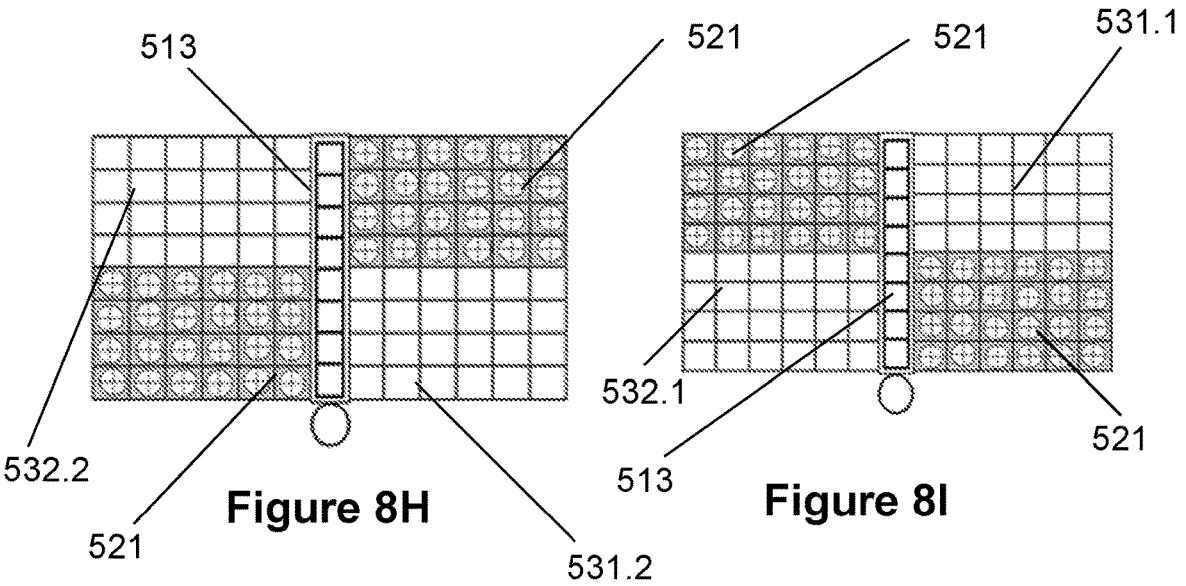
Figure 8H       Figure 8I

701

700

700

APPARATUS, SYSTEM AND METHOD FOR PLANTING

RELATED APPLICATIONS

This application claims priority to Australian Provisional Application No, 2019901651 entitled "Apparatus, System and Method for Planting", filed on 15 May 2020, the entire content of which is hereby incorporated herein by reference,

FIELD OF THE INVENTION

This invention relates generally a drill head, a drilling apparatus and a system and method for planting a plant.

BACKGROUND OF THE INVENTION

Agricultural, tree planting, and reforestation practices usually involve planting many plants over large areas. Containerised seedlings, also referred to as tubestock, have several advantages over direct seeding as they can be grown in controlled environments leading to higher quality planting stock and, thus, higher plant survival rates post planting.

Current planting techniques typically require exhaustive manual labour, are slow, costly and unsafe. These problems are hindering tree planting activities and planting success.

The logistics of moving a plant from an on-site location to being planted safely in the ground requires multiple manual operations. Currently the main method involves having a person unload plants from a vehicle or trailer driven along the area to be planted. Holes are then dug either manually using a spade or post-hole digger. Plants are then manually lifted and positioned in a dug hole and soil compacted on top. This is a tough manual task that requires physical strength and repetitive operations that can lead to strain and injury.

There are several hand held planting shovels and apparatuses that require the person or user to push the apparatus into the soil using their own body strength. These devices are difficult or incapable of being used for planting at sites where hard soils exist.

There are a variety of hand held drills and augers that can be used to assist a person who is planting to break up hard soil, however, these current apparatuses still require a person to manually operate, are not suitable in sticky clay soils and are not suitable for lugging around in challenging or steep terrain. The drills and augers can be challenging to carry during larger planting projects and if carried incorrectly can be unsafe for the users back.

There are drills, augers, ripper and shovel attachments that can be fitted to heavy machinery that can be used to dig the hole for planting. However, such attachments require manual planting once the hole is dug. Additionally, many of the attachments attach to large heavy machinery that when driven over the land compact the soil. Soil compaction impacts plant growth.

EP3011817 appears to describe a device (1) for transplanting plants (P) including a plant carrier (6,7,8,9) having a plurality of cells (C) for plants with root plugs arranged in parallel rows, an extraction arrangement for successively extracting the plants (P) from the cells (C), and a planting tool (5) for subsequent planting the extracted plants. The extraction arrangement includes a bottom support structure for covering cell bottoms and for supporting each root plug, and the bottom support structure includes a first plate (10) and a second plate (11) which are movable relative to each other and to the plant carrier (6,7,8,9) to successively open the bottom of the cells (C) thereby allowing the plants (P) to be extracted downwards, one by one, root plug first, towards the planting tool (5).

WO-2016/049217 appears to discuss techniques, including systems and methods, for planting using planting pods. A planting system can be configured to deliver pods including a payload (e.g., seeds, cuttings, or other planting materials) into or onto the ground at a predetermined location. In some embodiments, the automated planting system can include a mapping system that receives various sensor inputs and generates a map of a planting area. A pod planting system may use the map of the planting area to deliver pods to the planting area. The pod planting system may be executed automatically using the maps generated by the mapping system and/or manually by a remote operator. Each pod can include a payload to be planted on or in the ground by the pod planting system. Pods may be customized depending on the types of plants being planted, the terrain, prior planting results, etc.

A Potti Putki is a handheld device which can be used to push into soft or pre-ripped soil and deliver a plant into the ground via a chute. However, the device is not effective when used in hard soils.

During the early stages of a plant's life, whilst the plant is initially establishing its roots, trunks, branches and leaves, the plant is highly susceptible to being predated on by animals or accidentally or intentionally destroyed by humans. To prevent the plant being destroyed, tree guards or plant protectors may be used. However, these are typically made from plastics, metals or other non-biodegradable materials, which when left become waste where they can negatively impact the environment.

WO-2008/037985A1 appears to discuss an apparatus for protecting a young plant, the apparatus comprising a longitudinal sleeve member with a first end for insertion into the ground and a second end located at the opposing end of the longitudinal sleeve member to the first end, and a protector located at the first end and extending at least partially along the sleeve member, the protector comprising a coating of degradation-resistant material. Also provided is an apparatus for protecting a young plant, the apparatus having a substantially sleeve-like form comprising a support structure covered in a translucent film, the support structure allowing the passage of light therethrough. Also provided is a method for the production of such apparatuses.

US20030208953 appears to describe a tree shelter includes two semi-cylindrical cages having complementary coupling devices that secure the cages to each other into a cylindrical configuration. The cages are formed of a biodegradable material. Additives may be included in the material for added functionality, including a bittering agent, a deer repellant and/or a fertilizer. The tree shelter also may include a bird guard that prevents birds from entering the shelter. The shelter is easily and inexpensively manufactured and is easy to install in the field.

SUMMARY OF THE INVENTION

The object of the present invention is to substantially overcome, or at least ameliorate, one or more disadvantages of existing arrangement and/or provide a workable alternative.

In a first broad form, the present invention seeks to provide an apparatus for supporting a plant to be grown in the ground, the apparatus including:

a growing compartment for supporting at least part of a base of the plant; and, a sleeve housing at least part of a superterranean portion of the plant;

wherein a rate of bio-degradation of the growing compartment is faster than a rate of bio-degradation of the sleeve, to thereby allow the base of the plant to at least partially establish in the ground, while the sleeve houses the part of the superterranean portion.

In one embodiment, the base of the plant includes the roots.

In one embodiment, the growing compartment supports the base of the plant and a plant substrate.

In one embodiment, the plant substrate includes any one or more of:

a potting mix;

soil;

vermiculite;

growing media; and, compost.

In one embodiment, the plant includes tubestock.

In one embodiment, the growing compartment includes a base and at least one wall extending therefrom, to thereby to form the compartment.

In one embodiment, the base is substantially circular.

In one embodiment, the sleeve extends at least partially over the at least one wall of the growing compartment.

In one embodiment, the sleeve is configured to at least partially house leaves and branches of the plant.

In one embodiment, the sleeve is configured to house the superterranean portion of the plant during planting.

In one embodiment, the sleeve is provided on an outer surface of the growing compartment and extends upwardly therefrom, in order to house the superterranean portion.

In one embodiment, the sleeve is substantially cylindrical.

In one embodiment, the apparatus includes nurturing media for at least one of soil remediation and plant nutrition.

In one embodiment, the nurturing media includes at least one of:

nutrients;

fertiliser;

water crystals; and pH remediators.

In one embodiment, the nurturing media is provided in the growing compartment.

In one embodiment, the apparatus includes a nurturing package which houses the nurturing media, the nurturing package provided on an inner surface of the base of the growing compartment.

In one embodiment, the growing compartment is at least partially composed of material suitable to at least partially retain moisture.

In one embodiment, the material includes at least one of:

coir;

peat;

woodchip; and, paper pulp.

In one embodiment, the sleeve is substantially woven.

In one embodiment, the sleeve is substantially composed of bamboo.

In a second broad form, the present invention seeks to provide a drill head for planting a plant, the drill head including a channel for receiving the plant, wherein in use, the drill head is:

operable to rotationally drill a hole; and, openable to release the plant from the channel into the hole, to thereby plant the plant.

In one embodiment, the channel is axially aligned with the drill head.

In one embodiment, the channel is co-axial with the drill head.

In one embodiment, the drill head defines a drill end and a plant receiving end, wherein the channel extends from the drill end to the plant end.

In one embodiment, the drill head includes opposing jaws at the drill end, the opposing jaws openable to release the plant into the hole.

In one embodiment, the opposing jaws are closeable to define an edge.

In one embodiment, an outer surface of the drill head defines an auger.

In one embodiment, an outer surface of the drill head includes protrusions, wherein the protrusions are configured for agitating during drilling.

In one embodiment, the protrusions are arranged on an outer surface of the opposing jaws.

In one embodiment, the protrusions are helically arranged about an axis of the drill head, to thereby assist during drilling.

In one embodiment, the drill head includes a cutter.

In one embodiment, the cutter includes at least one blade.

In one embodiment, the cutter extends away from an/the axis of the drill head.

In one embodiment, the cutter is arranged relative to the drill head such that when in use the cutter remains above an opening of the hole.

In a third broad form, the present invention seeks to provide a drilling apparatus for planting a plant, the drilling apparatus including:

a frame, the frame supporting:

the drill head of any one of the embodiments described herein;

a motor operable to rotate the drill head; and, a displacement actuator operable to displace the drill head.

In one embodiment, the frame supports an opening actuator operable to open the drill head.

In one embodiment, the drilling apparatus includes the cutter of any one of the embodiments described herein, wherein the cutter is provided to a rotating part of the drilling apparatus other than the drill head.

In one embodiment, the frame supports a plant guide configured to guide the plant into the channel of the drill head for planting.

In one embodiment, the plant guide is axially aligned with the drill head.

In one embodiment, the apparatus includes at least one bearing mounted to the frame, the plant guide being received in the at least one bearing.

In a fourth broad form, the present invention seeks to provide a dispensing apparatus for the storage and dispensation of a plurality of plants for planting, the dispensing apparatus including:

a compartment for supporting the plants, the compartment including an inlet for receiving the plants, and an outlet; and, an actuator operable to selectively dispense the plants from the outlet.

In one embodiment, the apparatus includes a conveyor to convey the plants towards the outlet.

In a fifth broad form, the present invention seeks to provide a backfilling apparatus for use with a drilling apparatus for planting a plant, the backfilling apparatus including:

a soil guide, wherein in use the soil guide is operable to guide soil towards the plant which is planted by the drilling apparatus.

In one embodiment, the soil guide includes a guide member adapted to guide the soil towards the plant, wherein the guide member is moveable to guide the soil towards the plant.

In one embodiment, the backfilling apparatus includes a guiding actuator operable to move the soil guide.

In a sixth broad form, the present invention seeks to provide a compacting apparatus for use with a drilling apparatus for planting a plant, the soil compacting apparatus including:

a soil compactor, wherein in use the soil compactor is operable to compress the soil at least partially around the plant which is planted by the drilling apparatus.

In one embodiment, the soil compactor means includes a compacting member adapted to compact the soil at least partially around the plant, wherein the compacting member is moveable to compress the soil.

In one embodiment, the compacting apparatus includes a compacting actuator operable to move the soil compactor.

In a seventh broad form, the present invention seeks to provide a backfilling and compacting apparatus for use with a drilling apparatus for planting a plant, the backfilling and compacting apparatus including:

the soil guide of any one of the embodiments described herein, and the soil compactor of any one of the embodiments described herein.

In one embodiment, the drilling apparatus includes the backfilling apparatus of any one of the embodiments described herein.

In one embodiment, the backfilling apparatus is supported by the frame.

In one embodiment, the drilling apparatus includes the compacting apparatus of any one of the embodiments described herein.

In one embodiment, the compacting apparatus is supported by the frame.

In one embodiment, the compacting actuator is the displacement actuator.

In one embodiment, the drilling apparatus includes the backfilling and compacting apparatus of any one of the embodiments described herein.

In one embodiment, the backfilling and compacting apparatus is supported by the frame.

In an eighth broad form, the present invention seeks to provide a system for planting a plurality of plants, the system including:

a vehicle including:

a dispensing apparatus according to any one of the embodiments described herein;

a drilling apparatus according to any one of the embodiments described herein;

wherein in use:

the vehicle is operable to selectively position the drilling apparatus;

the dispensing apparatus is operable to selectively dispense the plant to the drilling apparatus; and, the drilling apparatus is operable to drill the hole and release the plant, to thereby plant the plant.

In one embodiment, the system includes the backfilling apparatus according to any one of the embodiments described herein.

In one embodiment, the system includes the compacting apparatus according to any one of the embodiments described herein.

In one embodiment, the system includes the backfilling and compacting apparatus according to any one of the embodiments described herein.

In one embodiment, the vehicle is at least partially autonomous.

In one embodiment, in use, the system is configured to deliver at least one of water and fertiliser to at least one of the planted plant and the hole.

A method of planting a plurality of plants, the method including using the system according to any one of the embodiments described herein, wherein the method includes:

operating the vehicle to selectively position the drilling apparatus for drilling a plurality of holes;

operating the drilling apparatus to drill the holes; and, operating the drilling apparatus to open the drill head in respective holes to release the plurality of plants.

In one embodiment, the method includes at least partially autonomously operating the vehicle.

In one embodiment, the method includes selectively dispensing a plant to the drilling apparatus from a dispensing apparatus includes a plurality of plants.

In one embodiment, the method includes operating the drilling apparatus to retract the open drill head from respective holes;

In one embodiment, the method includes operating the drilling apparatus to extend the open drill head over the planted plants to thereby embed the planted plants.

In one embodiment, the method includes delivering at least one of water and fertiliser to the plurality of plants.

In one embodiment, the method includes guiding soil towards the plurality of plants.

In one embodiment, the method includes operating the backfilling apparatus according to any one of the embodiments described herein.

In one embodiment, the method includes compacting soil at least partially around the plurality of plants.

In one embodiment, the method includes operating the compacting apparatus according to any one of the embodiments described herein.

BRIEF DESCRIPTION OF THE DRAWINGS

An example of the present invention will now be described with reference to the accompanying drawings, in which:

FIG. 8G is a schematic diagram in cross sectional view of a further example of a dispensing apparatus for storing and dispensing a plurality of plants;

FIG. 8H is a plan view of the example of FIG. 8G;

FIG. 8I is a plan view of the example of FIG. 8G;

DETAILED DESCRIPTION OF THE INVENTION

Figure 1A:
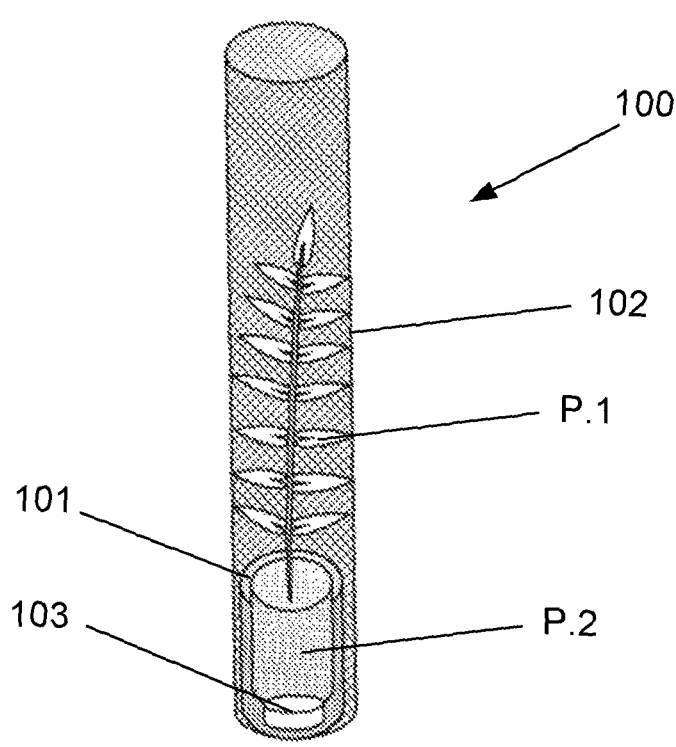
FIGS. 1A and 1B are schematic diagrams of an example of an apparatus for supporting a plant to be grown in the ground.
Figure 1B:
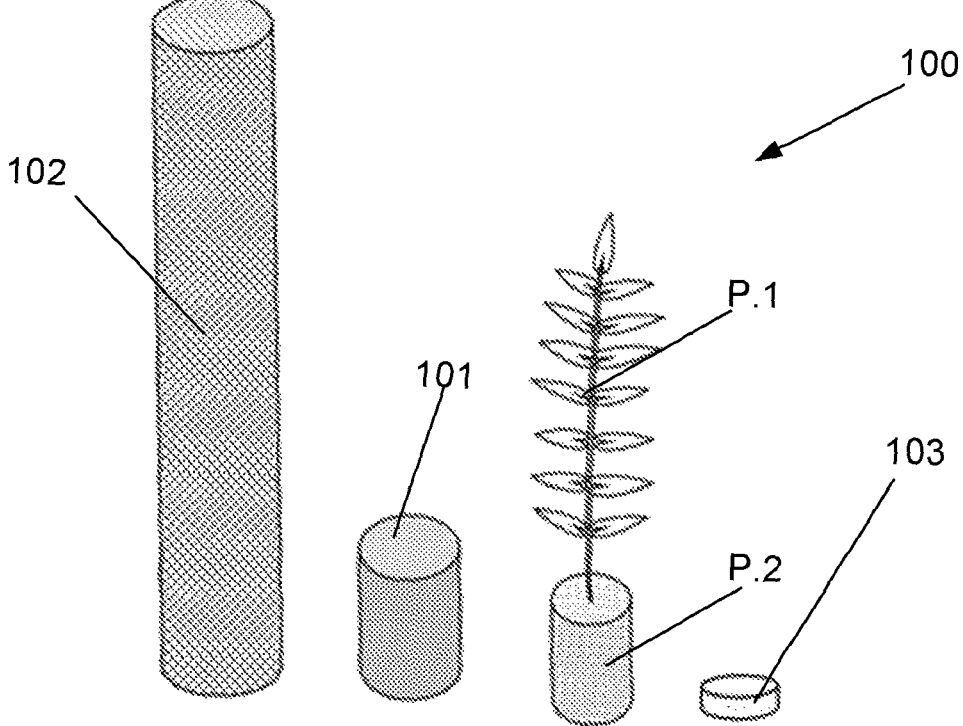

An apparatus for supporting a plant to be grown in the ground will now be described with reference to FIGS. 1A and 1B.

In this example, the apparatus 100 includes a growing compartment 101 for supporting at least part of a base P.2 of the plant P. In this example, the growing compartment 101 is substantially shaped in the manner of a cylinder with a single enclosed end. However, it will be appreciated that any suitable shape of growing compartment 101 may be used. For example, the growing compartment 101 may be substantially shaped in the manner of an open ended cylinder, a cone, cube, sleeve, or the like.

The apparatus further includes a sleeve 102 housing at least part of a superterranean portion P.1 of the plant P. In this regard, the sleeve 102 of this example is shaped substantially in the manner of an open ended cylinder. However, any suitable shape of sleeve 102 may be used, such as a including a closed end above the superterranean portion P.1, a sleeve 102 with a substantially square or rectangular cross-section, or the like.

In this example, a rate of bio-degradation of the growing compartment 101 is faster than a rate of bio-degradation of the sleeve 102, to thereby allow the base P.2 of the plant P to at least partially establish in the ground, while the sleeve 102 houses the part of the superterranean portion P.1.

Accordingly, the above example is particularly advantageous as it provides a biodegradable housing for a plant or tubestock, which facilitates the establishment of the plant's root system into the ground while maintaining a self-supporting protective housing around the plant (stem, leaves, branches, etc.). This is due to the growing compartment 101 biodegrading first, thus allowing roots to establish within the ground, while the sleeve 102 degrades at a slower rate, thus protecting the above-ground portion of the plant for longer. Thus, plant survival rates are increased. Additionally, as both the sleeve 102 and growing compartment 101 are biodegradable, they do not contribute to unbiodegrable landfill or environmental waste, and optionally, may benefit the plant in terms of nutrient delivery as a result of the biodegradation.

A number of further features will now be described.

In one example, the growing compartment 101 supports the base of the plant P.2 and a plant substrate. This may be beneficial, particularly in the event the plant is to be stored for a period, including an extended period, the plant substrate may assist in sustaining the plant during storage and/or transport, including assisting with water retention, nutrient delivery, root protection, or the like. Plant substrates may include any suitable substrate, including any one or more of a potting mix, soil, vermiculite, growing media, compost or the like.

In some examples, the plant and optionally growing compartment form a tubestock.

The base of the plant in this example includes roots of the plant, including for example, subterranean roots of the plant. Thus, in this manner the growing compartment 101 may support the plant in a substantially upright position, with the roots contained, for example, in a plant substrate such that the substrate and roots are substantially provided within the growing compartment.

As discussed above, in some examples the growing compartment 101 includes a base and at least one wall extending therefrom, to thereby form the compartment. For example, the base may be shaped substantially in the manner of a circle, square, rectangle, or the like. However, this is not essential and in some examples the growing compartment 101 is formed of an open ended sleeve and/or tube which at least partially supports the base P.2 of the plant.

In some instances, the sleeve 102 extends at least partially over the growing compartment 101. In this regard, the sleeve 102 may extend at least partially over one or more walls of the growing compartment 101. This can be beneficial in ensuring ease of storage and transport as the sleeve 102 contains the apparatus 100 including plant therewithin. However, in other examples the sleeve 102 and growing compartment 101 may be coupled together, for example, such that an upper edge of the growing compartment 101 is attached to a lower edge of the sleeve 102, or the like.

In some instances, the sleeve 102 is provided on an outer surface of the growing compartment 101 and extends upwardly therefrom, in order to house the superterranean portion. In this regard, the sleeve 102 may be retained around the plant and growing compartment via interference of friction fit, for example, such that fasteners are not required in order to secure the sleeve 102.

In any event, typically the sleeve 102 is configured to at least partially house leaves and branches of the plant. This can be particularly beneficial in protecting the leaves and branches after the plant is planted, for example, from being consumed or destroyed by animals, humans, or the like. Optionally the sleeve 102 may be configured to house the superterranean portion of the plant, for example, during planting.

Additionally or alternatively, the apparatus 100 may include nurturing media 103 for soil remediation and/or plant nutrition. The nurturing media 103 may be provided in any suitable manner for nurturing the plant, and in one example, the nurturing media 103 is provided in the growing compartment 101. In this regard, the nurturing media 103 may act to remediate the soil in the hole after planting and/or to provide nutrients to the plant prior to and/or after planting. In the example shown the nurturing media 103 is supported within the growing compartment 101 above the base, however in other examples the nurturing media 103 may be provided in any suitable location relative to the plant. In some examples, the nurturing media includes any one or more of nutrients, fertilizer, water crystals, and/or pH remediators.

In one example, the apparatus 100 includes a nurturing package which houses the nurturing media 103. For example, the nurturing package may be provided on an inner surface of the base of the growing compartment 101. In this regard, the nurturing package may suitably degrade in order to release the nurturing media 103 as appropriate. However, in other examples, the nurturing media 103 may be simply provided loose within the apparatus 100.

In one example, the growing compartment 101 is at least partially composed of material suitable to at least partially retain moisture. For example, the material may include one or more of coir, peat, woodchip and paper pulp. This is advantageous as it can ensure the base of the plant remains moist during storage and transport, as well as in the early stages of establishing the plant in the hole. Moreover, such material can, in some instances, promote biodegradability. In some examples, the growing compartment 101 is suitably arranged to retain the plant its roots and optionally nutritional media.

In some instances, the sleeve 102 is substantially woven. Beneficially this allows airflow and sunlight to penetrate the superterranean portion of the plant during transport, storage and following planting, while providing a housing which reduces the risk of animal or human consumption/destruction. Additionally, if the sleeve 102 is provided over at least part of the growing compartment 101, apertures in a woven sleeve can provide space for soil and roots to make contact with soil outside the apparatus 100, for example, after the growing compartment 101 has biodegraded. However, this is not essential, and if unwoven sleeve 102 is used, in some instances it may be beneficial to create holes in the sleeve to aid growth and soil contact.

The sleeve may optionally be substantially composed of bamboo, which advantageously is biodegradable. However, this is not essential as other biodegradable material may be used. In this regard, the rate of biodegradation of the sleeve may be any appropriate rate, and in some examples includes substantially degrading in approximately a year in an outdoor environment. Advantageously, the sleeve 120 may form a biodegraded mulch, which can be beneficial in reducing soil moisture loss through evaporation, and help promote healthy microorganism activity for better plant growth.

An example of a drill head for planting a plant will now be described with reference to FIGS. 2A to 4D.

While in this example, the drill head 210 is shown as part of a drilling apparatus 200, in other examples the drill head 210 may be provided separately, for example for retrofitting, or configured in any other appropriate manner. Drilling apparatus 200, such as the apparatus shown in this example, will be described in more detail below.

The drill head 210 in this example includes a channel for receiving the plant, wherein in use the drill head 210 is operable to rotationally drill a hole, and openable to release the plant from the channel, into the hole, to thereby plant the plant.

Beneficially, rotationally drilling a hole for the plant means the drill head 210 is able to penetrate and break up soil, including hard soil, when creating the hole. Moreover, as the drill head 210 is openable, the plant is able to be released into the hole while the drill head 210 remains in place and without the need for the drill head 210 to be removed prior to planting. Typically, the drill head 210 is retracted while open, which allows soil to fall around the planted plant.

Of particular advantage is the ability for the drill head 210 to break up and aerate soil, release a plant into the created hole, and retract the drill head 210 allowing the aerated soil to settle around the planted plant. Accordingly, shoveling or removal of significant amounts of soil in order to create the hole is not necessary, nor is an additional step of backfilling soil around the planted plant. The drill head 210 thus significantly increases planting efficiency by saving time and minimizing the number of tasks required to plant the plant. Moreover, in some examples, the drill head 210 may be used to minimize and/or negate, the need for human or operator intervention during the planting process. This will be discussed in further detail below.

A number of further features will now be described.

In this example, the channel is axially aligned with the drill head 210. In particular, the channel is co-axial with the drill head 210. Accordingly, in this instance the channel aligns with the axis of the drill head, running through the centre of the drill head 210. This can be beneficial in positioning the plant directly into the centre of the hole created by the drill head 201. Moreover, typically the drill head 210 is used in an upright position, thus alignment of the channel within the head 210 allows the plant to be positioned in a substantially upright manner. However, this is optional, and in some instances the channel may be offset in some manner from the drill head 210 axis.

Moreover, in some instances the drill head 210 defines a drill end and a plant receiving end, where the channel extends from the drill end to the plant receiving end. Additionally in this instance the drill head includes opposing jaws 211.1, 211.2 at the drill end, the opposing jaws 211.1, 211.2 being openable to release the plant into the hole. Beneficially, the jaws 211.1, 211.2 allow the plant to be released from the plant releasing end after the hole is drilled but while the drill head 210 remains within the hole. Accordingly, the jaws 211.1, 211.2 act to support the sides of the hole while the plant is released. Beneficially, the sides of the hole may be released once the plant is in position within the hole, for example by retracting the drill head 210 while the jaws 211.1, 211.2 remain open. The soil at the sides of the hole can then resettle against the plant, and this will be explained in further detail below.

Note that opposing jaws 211.1, 211.2 are optional, and in other examples the drill head 210 may be openable by any suitable means.

In some examples, the opposing jaws 211.1, 211.2 are closable to define an edge. The edge may be advantageous in penetrating particularly hard or compacted soil. However, this is optional and in other examples the opposing jaws 211.1, 211.2 may close to define any suitable shape including, for example, a point.

In some examples, the opposing jaws 211.1, 211.2 form a clamshell arrangement. This can be advantageous in providing a suitable shaped inner surface within the jaws 211.1, 211.2 to accommodate a plant to be released, as well as providing an appropriate outer drilling surface for the jaws 211.1, 211.2 which can act to break up soil and drill the hole.

In some examples, the outer surface of the drill head defines an auger, for example, in order to break up hard or compact soil and/or aerate soil while drilling the hole. However, this is not essential. In other examples, the outer surface of the drill head includes protrusions 212, where the protrusions 212 are configured for agitating during drilling. In this regard, the protrusions 212 may be arranged in any suitable manner, and in some examples are arranged on an outer surface of the opposing jaws 211.1, 211.2. The protrusions 212 may be positioned in any suitable manner, and in the example shown are helically arranged about an axis of the drill head, to thereby assist during drilling. However, in other examples the protrusions 212 may be arranged in any suitable manner.

An example of a drilling apparatus 200 for planting a plant will now be described with reference to FIG. 2A to 4D. In this regard, reference to a "plant" in these examples may include a plant or a plant housed in the apparatus for supporting a plant as described in any of the examples herein or a plant housed in any other appropriate manner.

In this example, the drilling apparatus 200 includes a frame 220 for supporting a drill head 210, such as the drill head 210 describe in any of the examples herein. The apparatus 200 also includes a motor 230 operable to rotate the drill head 210, and a displacement actuator 240 operable to displace the drill head 210.

Accordingly, the drilling apparatus 200 in use rotates and downwardly displaces the drill head 210, in order to drill a hole. Once the plant is released in the hole, the drilling apparatus 200 retracts the drill head 210, thereby providing the planted plant. Beneficially, planting of the plant can be performed without the need to remove soil from the hole and backfill thereafter. Moreover, simultaneous rotating and downward displacement of the drill head 210 facilitates the planting of plants in compact or hard soils, in addition to agitating and aerating the soil around the planted plant. The apparatus 200 therefore streamlines the planting process, and reduces human intervention.

A number of further features will now be described.

In this example, the frame 220 supports an opening actuator 250 operable to open the drill head 210. However, in other examples, the opening actuator 250 may be supported or configured in any suitable manner.

In particular, the arrangement of the opening actuator 250 in this example is described in the following, however this arrangement is optional and any suitable opening actuator 250 arrangement may be used. A first end of the actuator 250 is coupled to the frame 220, and a second end of the actuator 250 is coupled to respective opposing jaws 211.1, 211.2. The first end of the actuator 250 includes two arms 251 which extend outwardly from the frame 220, the arms 251 including retractable telescopic members 252. The telescopic members 252 are operable to retractably displace an annual bearing 253 along an axis defined by the drill head 210.

The annular bearing 253 rotationally supports an opening mechanism 254 which is fixedly attached to respective opposing jaws 211.1, 211.2. The opening mechanism 254 includes two "L" shaped arms 255 rotationally supported by the annular bearing 253 which are pivotally coupled to second arms 256 at the second end of the actuator 250, the second arms being pivotally coupled to the respective jaws 211.1, 211.2. In the example shown, support members 257 are coupled between second ends of the second arms 256. In use, the telescopic arms 252 expand to displace the annual bearing 253 toward the drill end of the drill head 210. In turn the "L" shaped arms 255 pivot first ends of the second arms 256 outwardly of the drill axis, pivoting the respective jaws 211.1, 211.2 inwardly about the second end of the second arms 256, thus actuating closing the jaws 211.1.

To actuate opening of the jaws 211.1, 211.2, the telescopic arms 252 retract displacing the annular bearing 253 away from the drill end of the drill head 210. A first end of the "L" shaped arms 255 is similarly displaced, pivoting the first ends of the second arms 256 inwardly toward the drill axis. In turn the respective jaws 211.1, 211.2 are outwardly pivoted about the coupling with the second end of the second arms 256, thus actuating opening of the jaws 211.1.

Figures 12A, 12B, 12C:
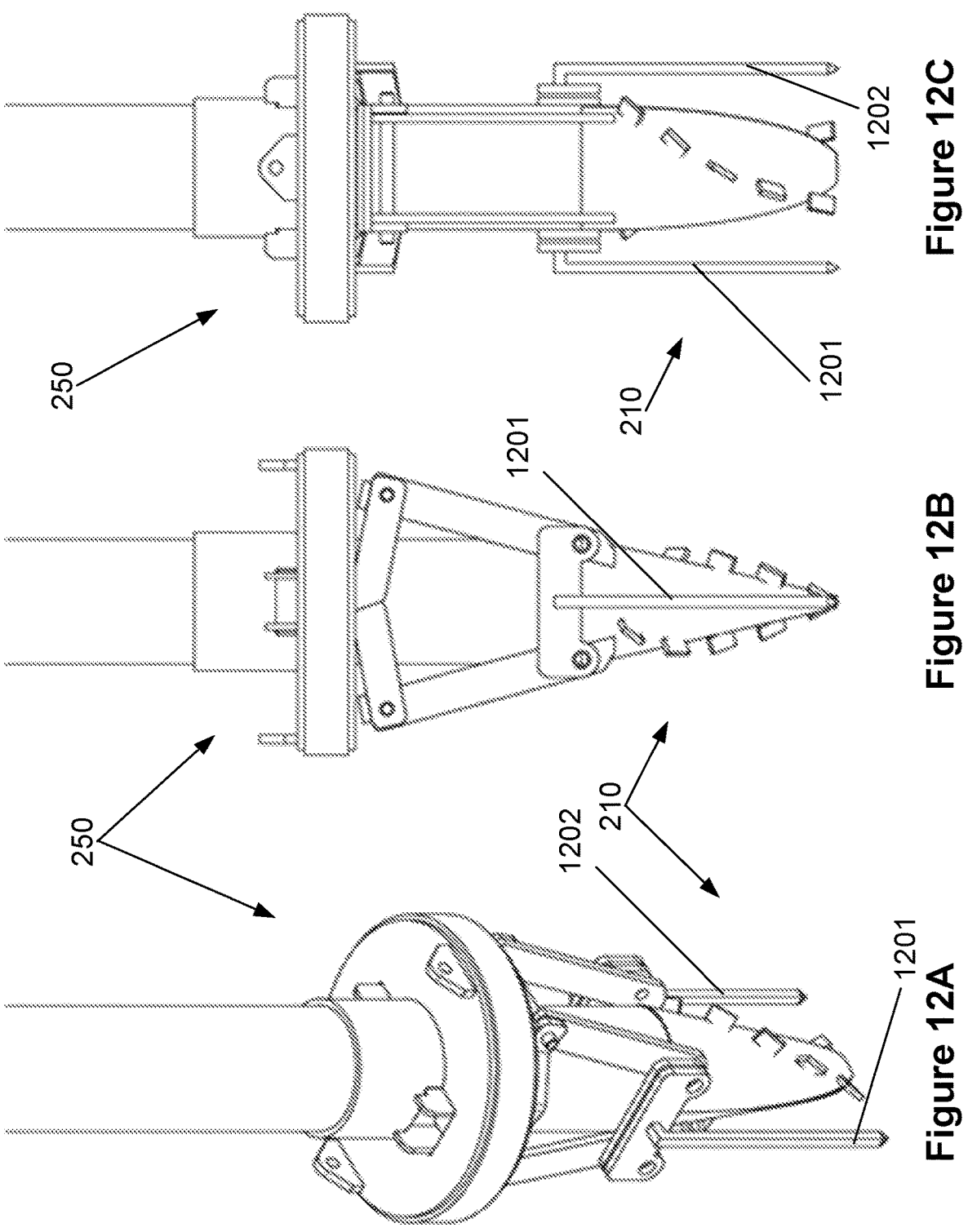
FIG. 12A is a schematic diagram of a perspective view of a further example of a drill head in extended configuration.
FIG. 12B is a side view of the example of FIG. 12A.
FIG. 12C is a front view of the example of FIG. 12A.

Optionally, the drill head 210 may include agitators 1201, 1202, such as shown in FIGS. 12A to 12C. In this example, first ends of the agitators 1201, 1202 are mounted to the support members 257 coupled between the second arms 256. The agitators 1201, 1202 extend downwardly to a second end which substantially aligns with the drill end of the drill head 210. In other examples, the agitators 1201, 1202 may be provided in any suitable arrangement, such that they provide additional agitation of soil around the drill head 210.

In use, the agitators 1201, 1202 rotate in accordance with the drill head 210, breaking up, cutting and/or mixing the soil more efficiently and thus improving the opening of the drill head 210. Additionally, the agitators 1201, 1202 may break up clods and/or hard soil more efficiently, shift rocks, improve plant root penetration into the soil which is more optimally broken up, improving opening of the drill head 210 to allow more effective planting, and/or enable faster planting due to improved drill head 210 opening.

In an example, the drill head 210 may include cutter 1401, 1402 such as shown in FIGS. 14A to 15D. The cutter 1401, 1402 is arranged relative to the drill head 210 such that when in use the cutter 1401, 1402 remains above an opening of the hole (not shown). The cutter 1401, 1402 is positioned above a superior region of the jaws 211.1, 211.2.

In use, when the drill head 210 is rotated and displaced towards the extended configuration when drilling the hole, the blades 1401, 1402 are rotated to slash grass, weeds and/or other material in situ during planting of the plant. During drilling, the cutter 1401, 1402 remains above the opening of the hole to prevent the cutter 1401, 1402 from being damaged by the ground.

In the preferred form, the cutter 1401, 1402 includes opposing blades 1401, 1402 which extend away from the axis of the drill head 210. The opposing blades 1401, 1402 extend substantially horizontally from the drill head 210 axis when in use.

In the example shown in FIGS. 14A to 15D, the cutter 1401, 1402 is provided to a rotating part of the drilling apparatus other than the drill head 210. In this example, the blades 1401, 1402 are mounted to the support members 257 coupled between the second arms 256.

In other examples, the cutter 1401, 1402 may be provided in any suitable arrangement, such that they cut grass, weeds or other material in an area around the hole upon drilling and/or planting.

In any event, additionally or alternatively the frame 220 may support a guide 260 configured to guide the plant into the channel of the drill head 210 for planting. In the preferred embodiment, the guide 260 is a substantially vertical conduit for guiding the plant into the drill head. In this example shown, the guide 260 is axially aligned with the drill head 210. Beneficially this allows the plant to be appropriately directed into the drill head 210, ensuring an optimal orientation and placement.

The arrangement of the guide 260 in this example will now be described, however the any suitable arrangement may be used. Typically, the apparatus 200 includes at least one guide bearing 261, 262, mounted to the frame, the guide 260 being received in the at least one bearing 261, 262, and an example of this will now be described in more detail. In this example, the guide 260 includes an enclosed channel axially aligned with the drill head 210 axis. In addition, the guide is coupled to the plant receiving end of the drill head 210 in order to direct the plant into the drill head 210 for planting. The guide is rotationally supported by the frame 220 via guide bearings 261, 262. In this regard, the guide bearings 261, 261 each include an aperture for receiving and rotationally supporting the guide 260 therein.

An example of a displacement actuator 240 will now be described. As will be appreciated, any suitable displacement actuator 240 for displacing the drill head 210, for example, along the drill head 210 axis, may be used. However, in this example, the displacement actuator includes two telescopic displacement arms 240 attached at a first end to the frame 220 and at a second end to a slidable carriage 242. The slideable carriage 242 is slideably mounted to the frame 220 via guides. In use extension of the telescopic displacement arms 261 causes the carriage 242 to be downwardly displaced along the frame guides, and retraction of the telescopic displacement arms 240 causes the carriage 242 to be upwardly displaced along the frame guides. Fixedly mounted to the carriage 242 are the guide bearings 261, 262, the first end of the opening actuator 250, and the motor 230. As the guide bearings 261, 262 and the opening actuator 250 support the guide 260 and drill head 210, displacement of the carriage 242 thus displaces the drill head 210.

Also in this example, the guide 260 includes a flange 270 at a plant inlet end, the flange 270 for guiding the plant into the channel of the guide 260.

An example of the drilling apparatus 200 in use will now be described.

Figure 2A:
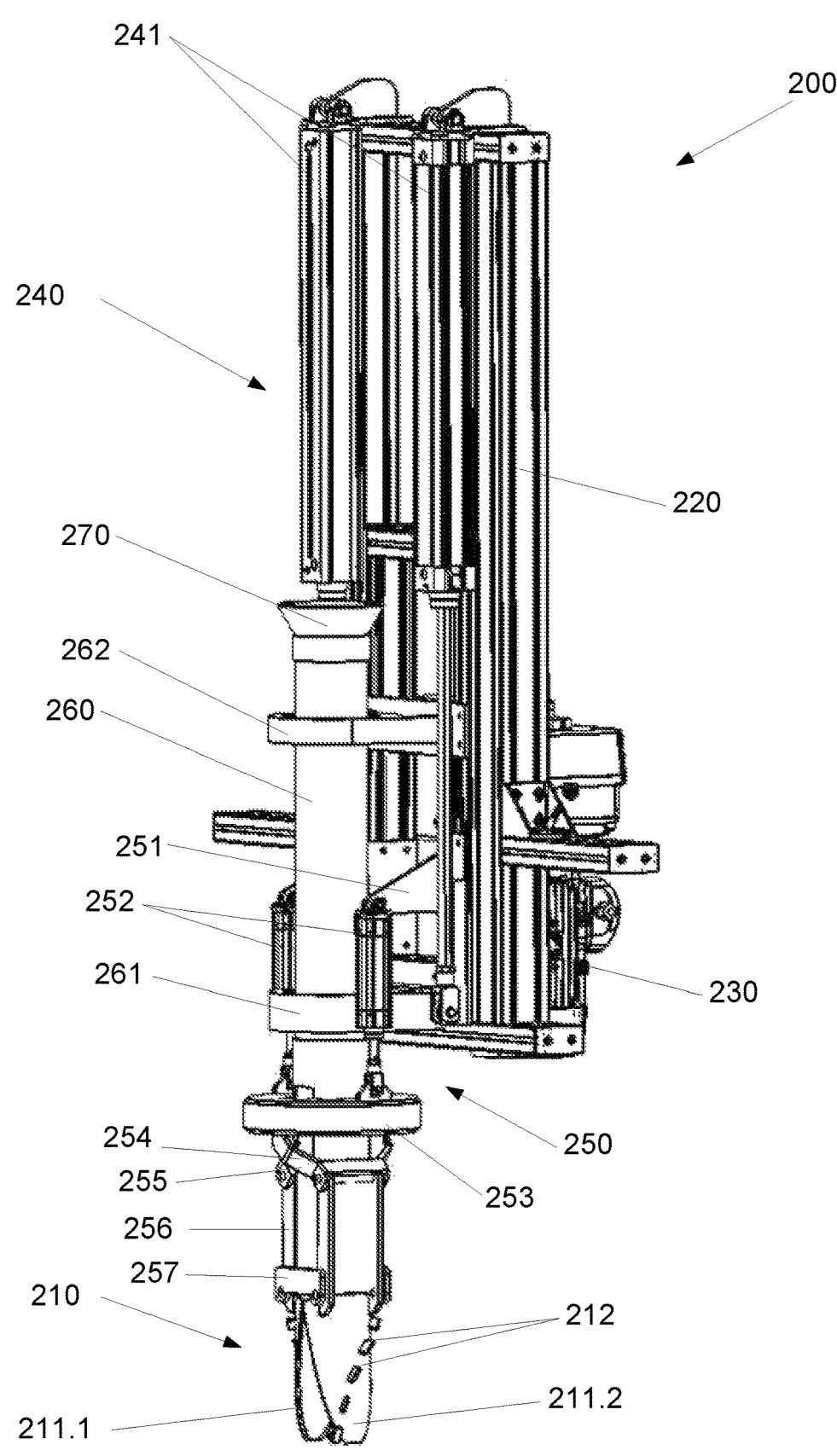
FIG. 2A is schematic diagram in perspective view of an example of a drilling apparatus for planting a plant in an extended, open configuration.
Figure 2B:
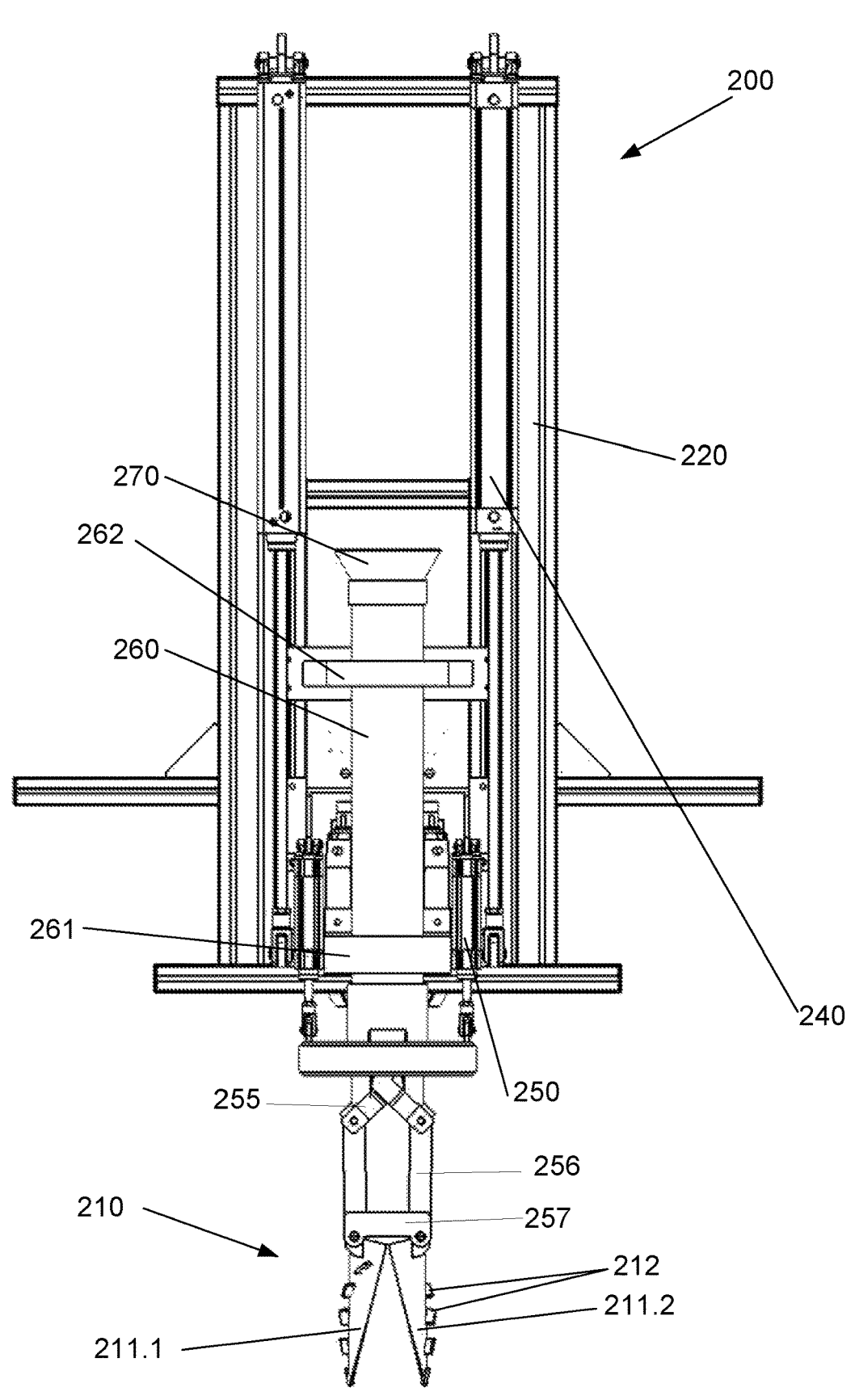
FIG. 2B is a front view of the example of the example of FIG. 2A.
Figure 2C:
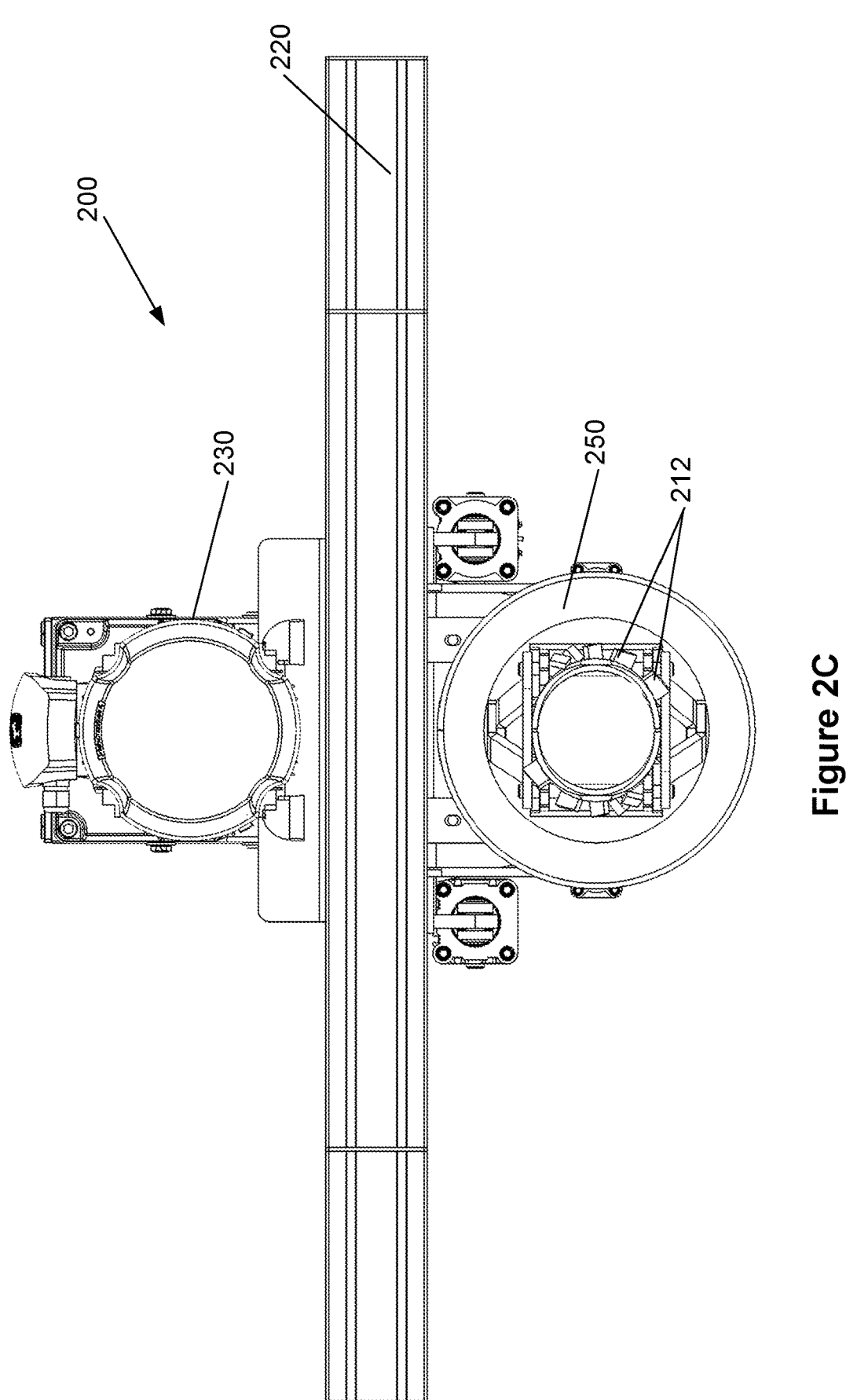
FIG. 2C is an end view of the example of the example of FIG. 2A.
Figure 3A:
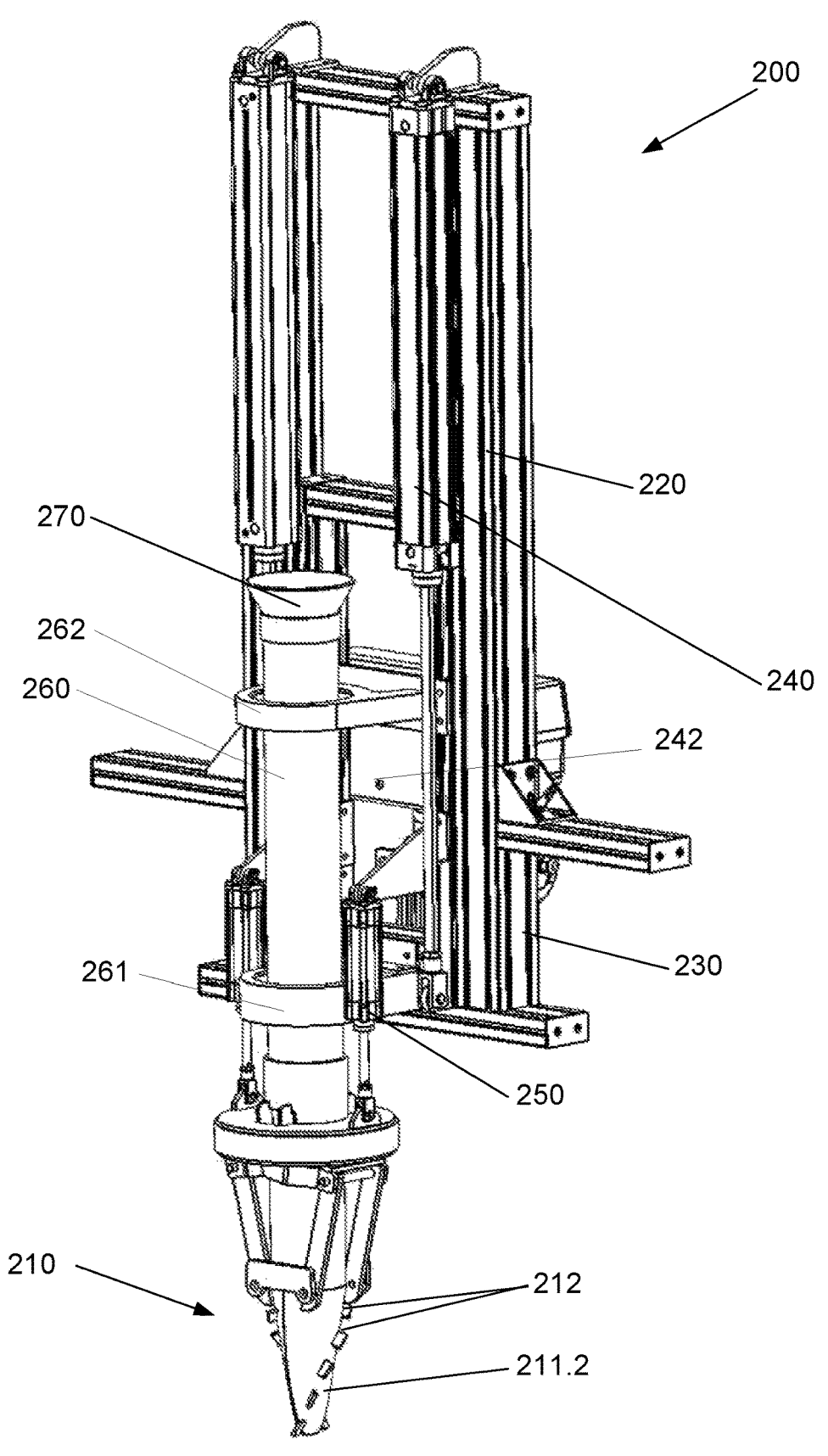
FIG. 3A is a schematic diagram in perspective view of the example of the example of FIG. 2A in a closed, extended configuration.
Figure 3B:
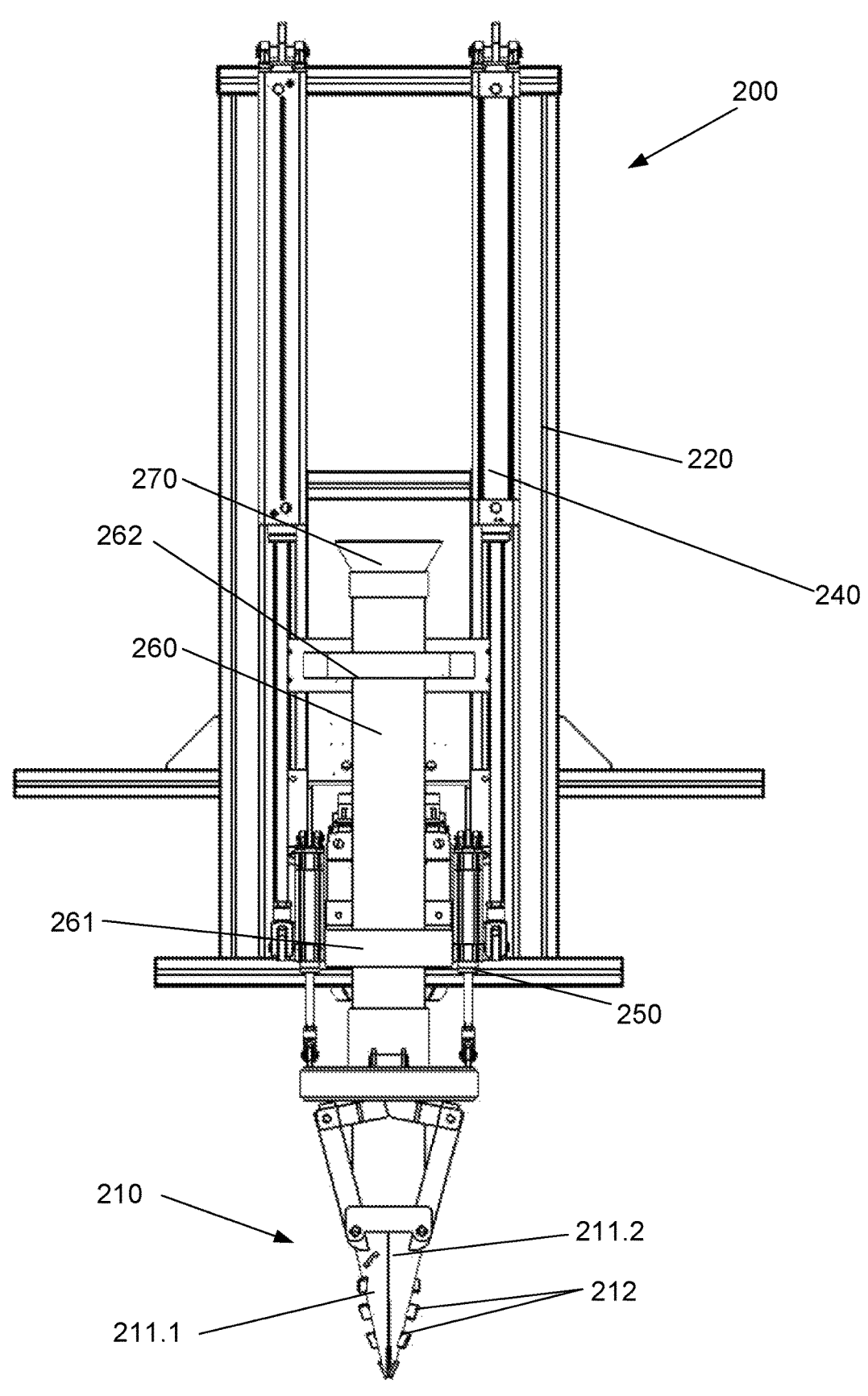
FIG. 3B is a front view of the example of the example of FIG. 3A.
Figure 3C:
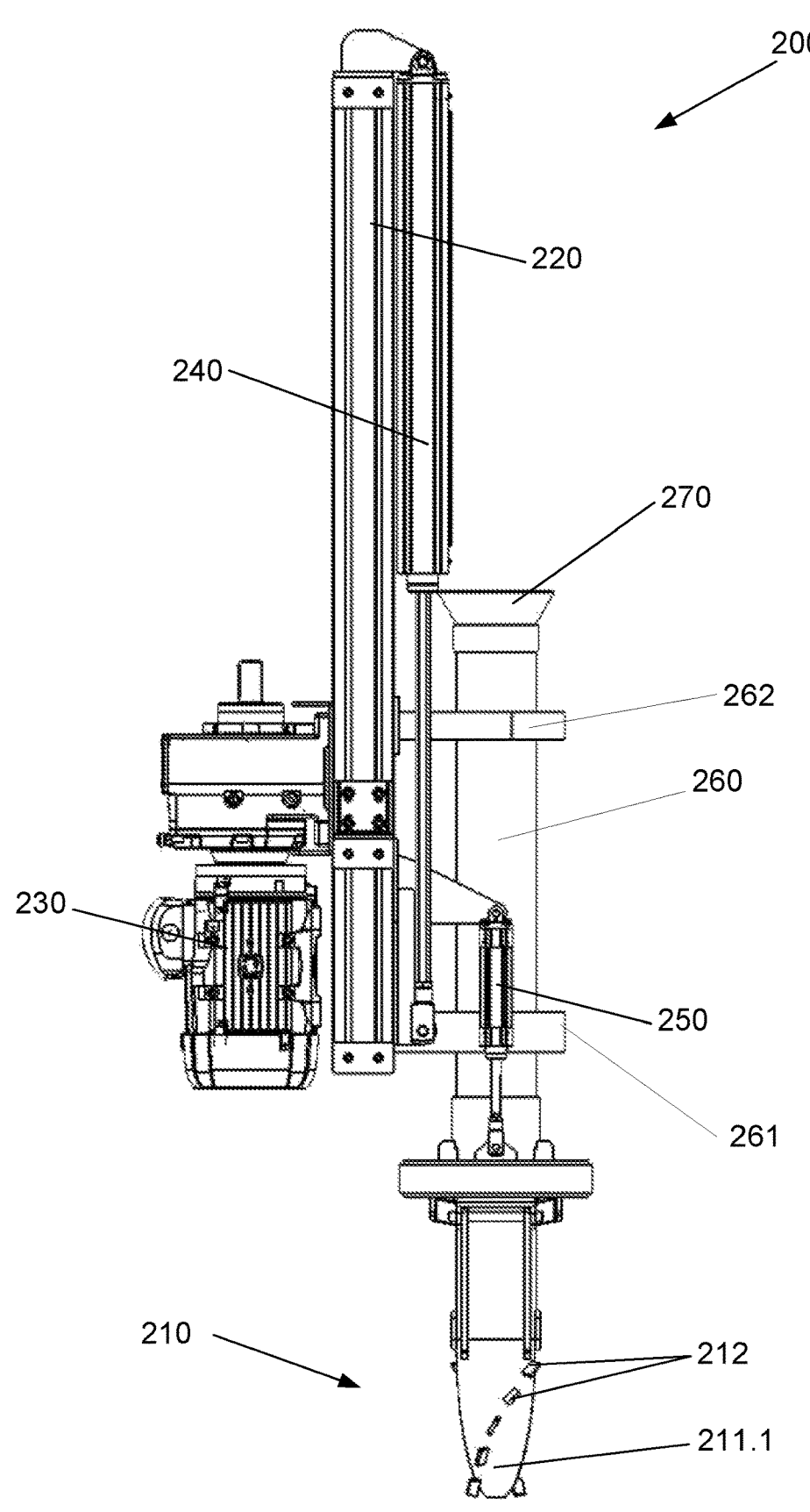
FIG. 3C is a side view of the example of the example of FIG. 3A.
Figure 3D:
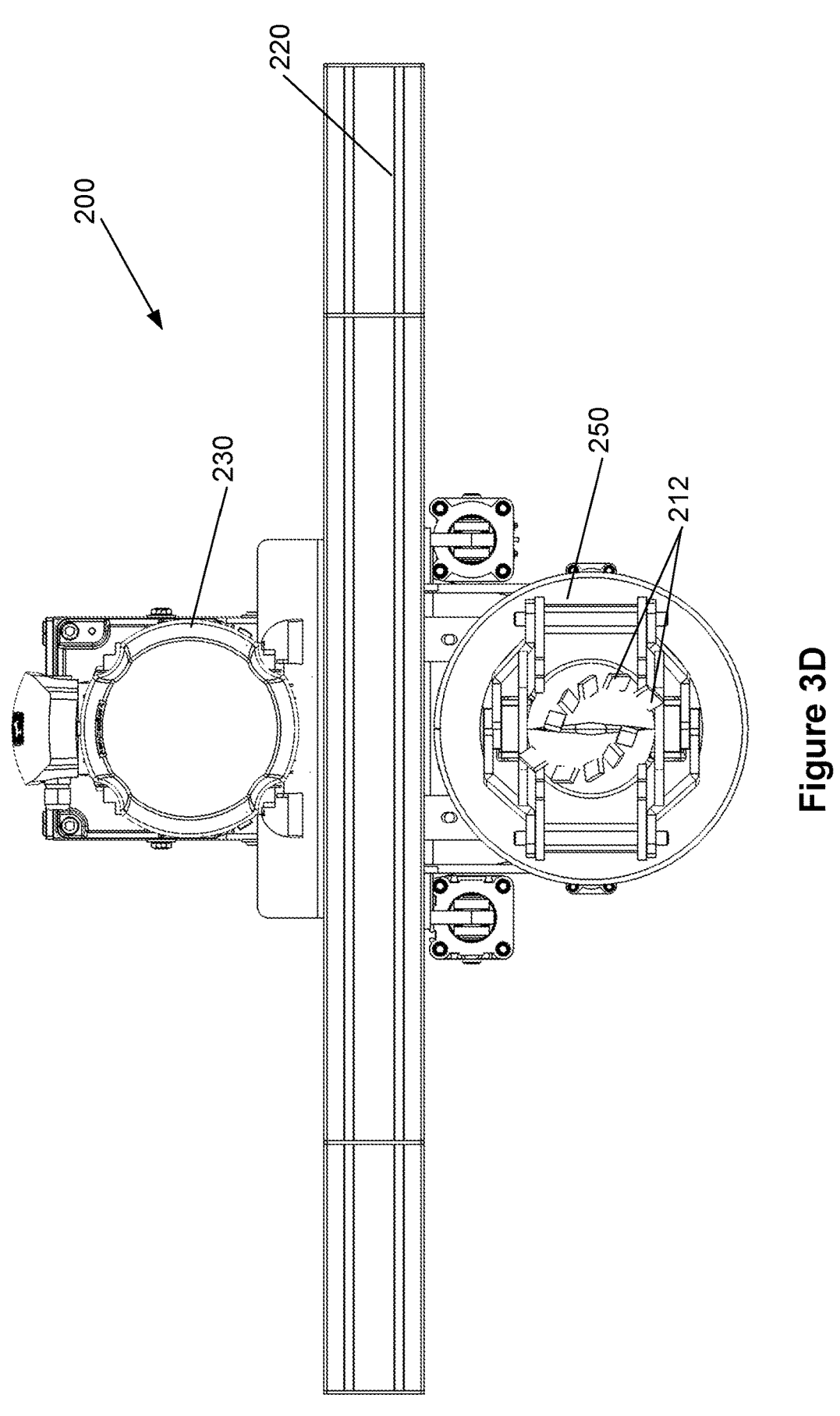
FIG. 3D is an end view of the example of the example of FIG. 3A.
Figure 4A:
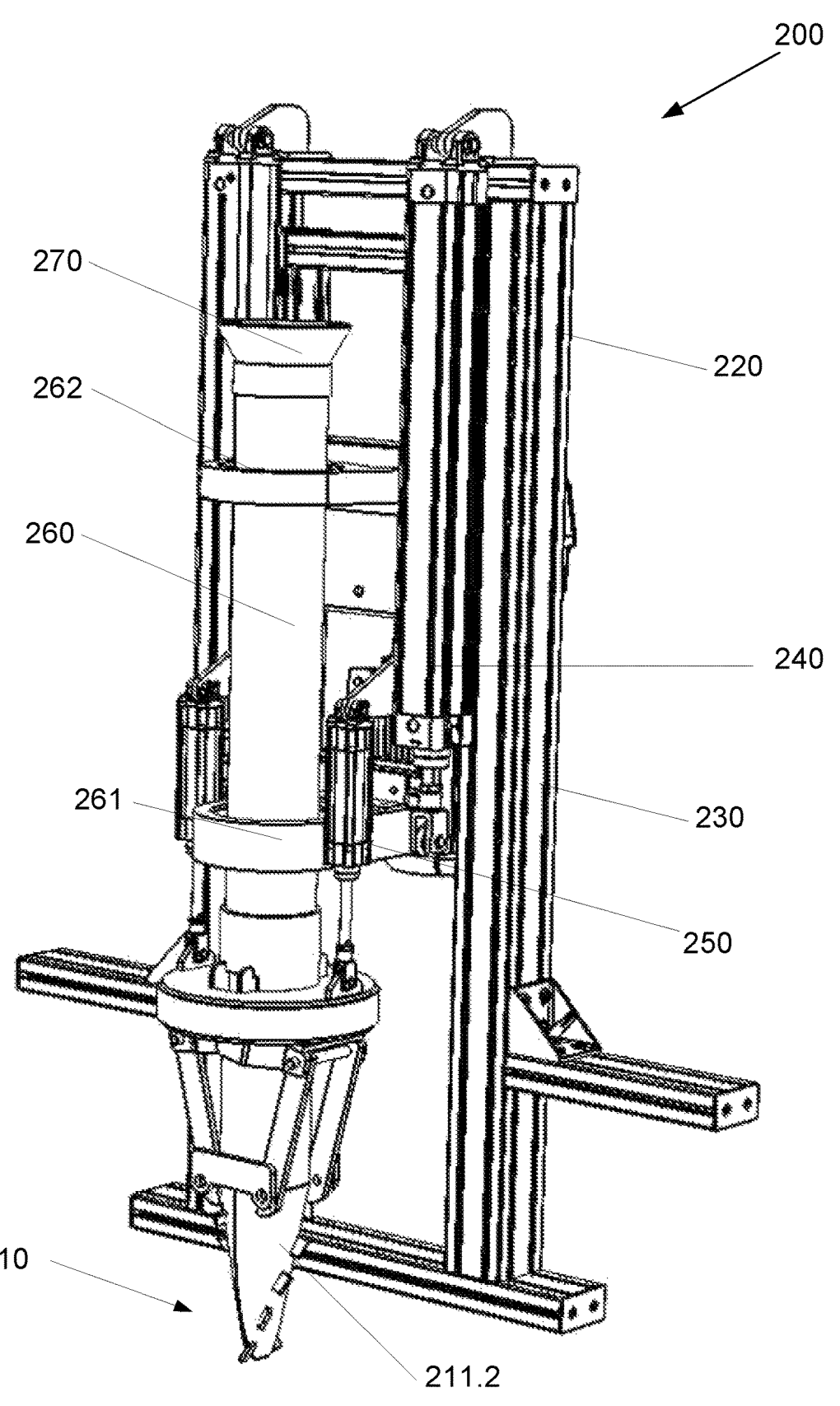
FIG. 4A is a schematic diagram in perspective view of the example of the example of FIG. 2A in a closed, retracted configuration.
Figure 4B:
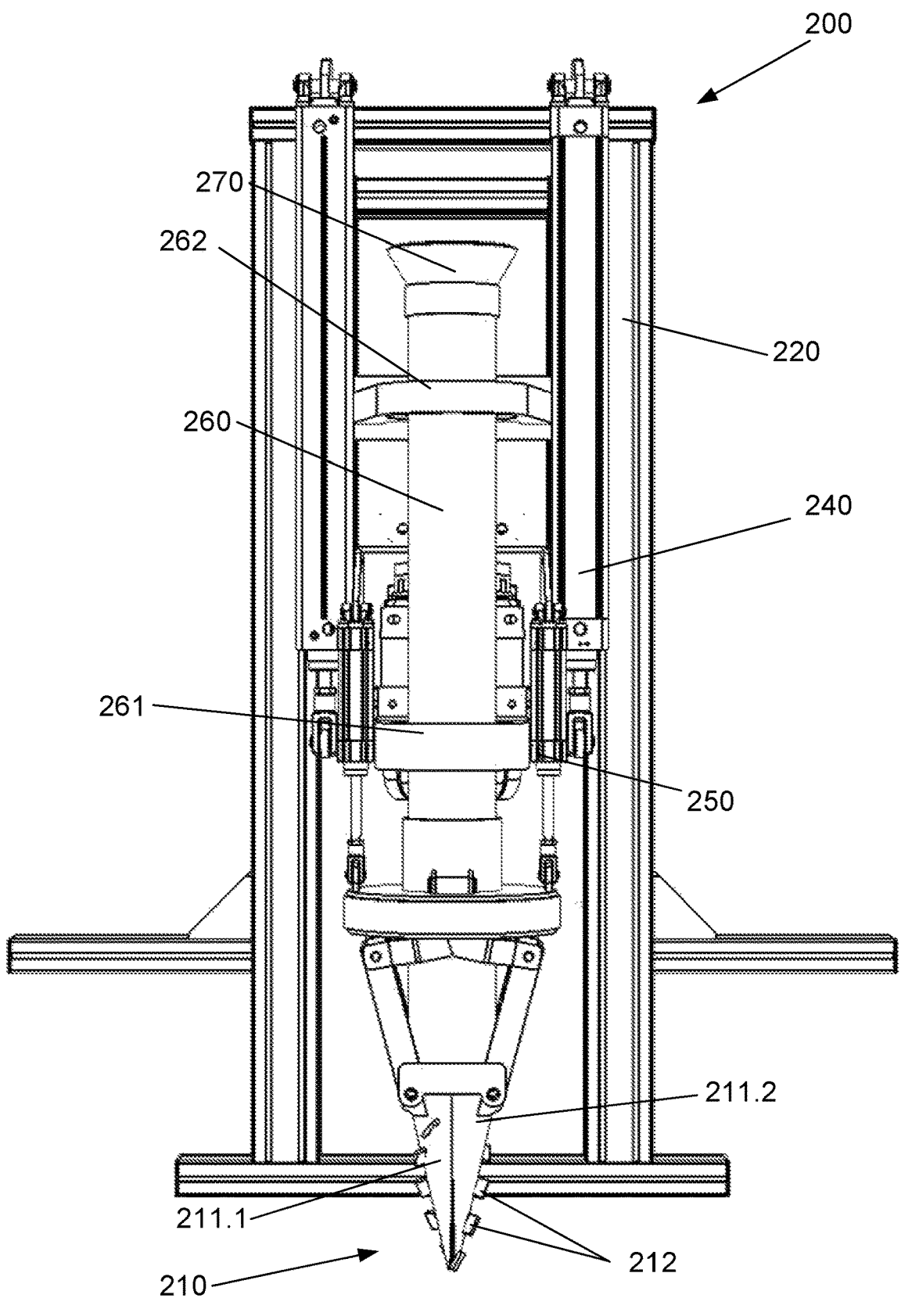
FIG. 4B is a front view of the example of the example of FIG. 4A.
Figure 4C:
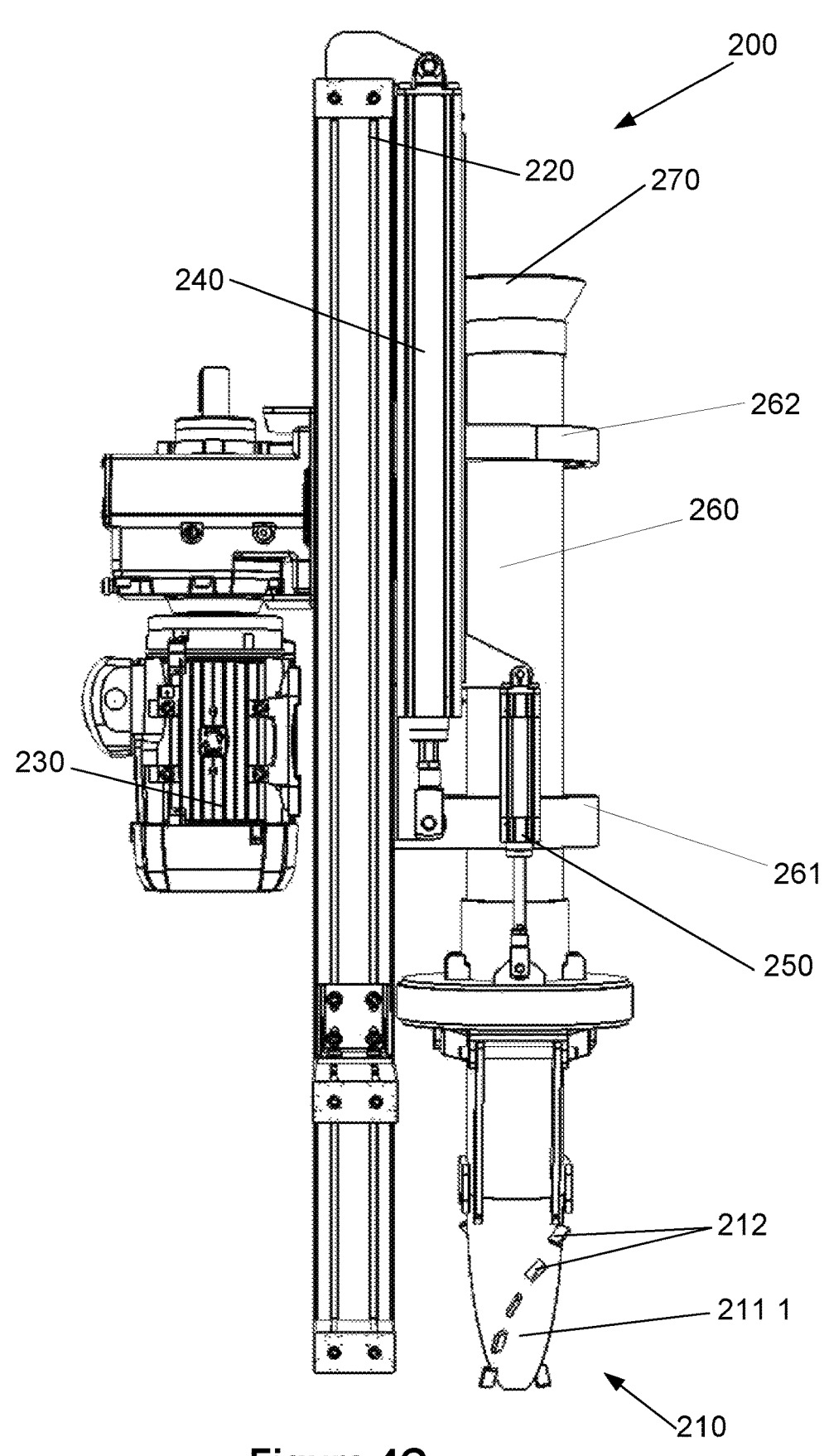
FIG. 4C is a side view of the example of the example of FIG. 4A.
Figure 4D:
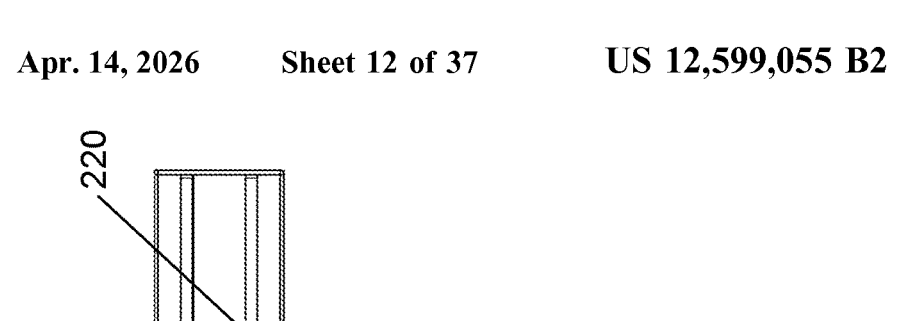
FIG. 4D is an end view of the example of the example of FIG. 4A.
Figure 5A:
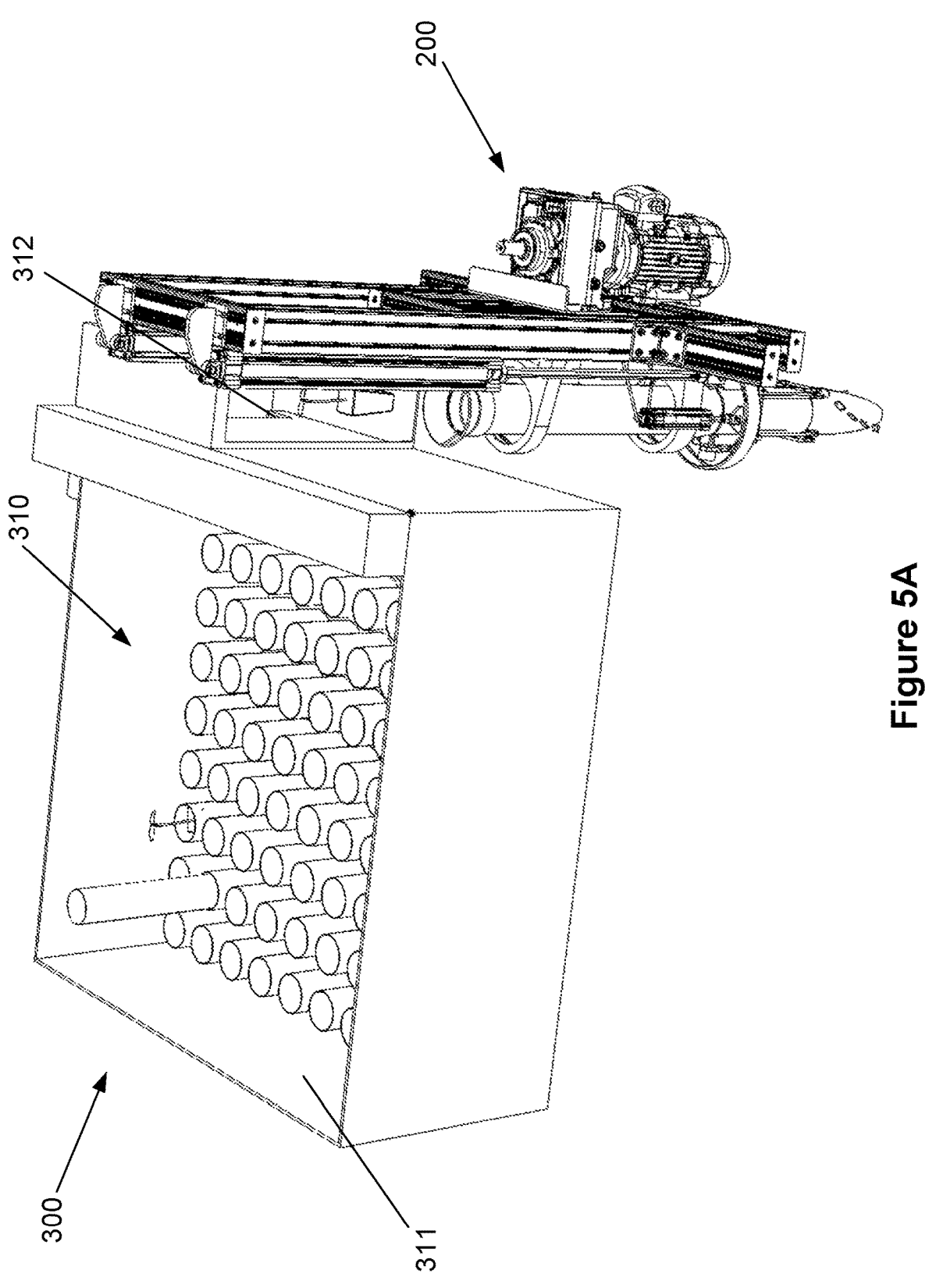
FIG. 5A is a schematic diagram in perspective view of an example of a dispensing apparatus for storage and dispensation of a plurality of plants with the drilling apparatus of the example of FIG. 2A.
Figure 5B:
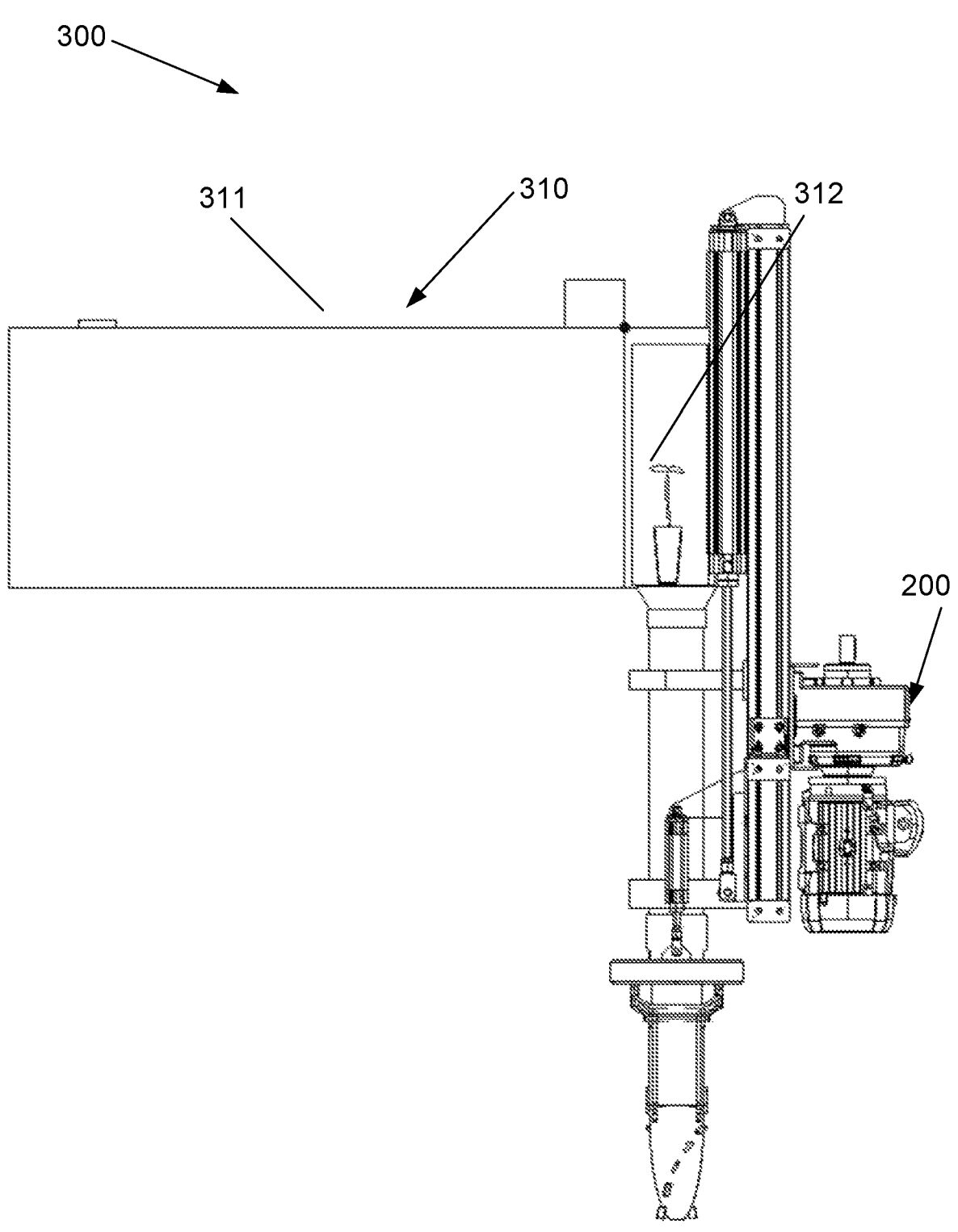
FIG. 5B is a side view of the example of the example of FIG. 5A.
Figure 5C:
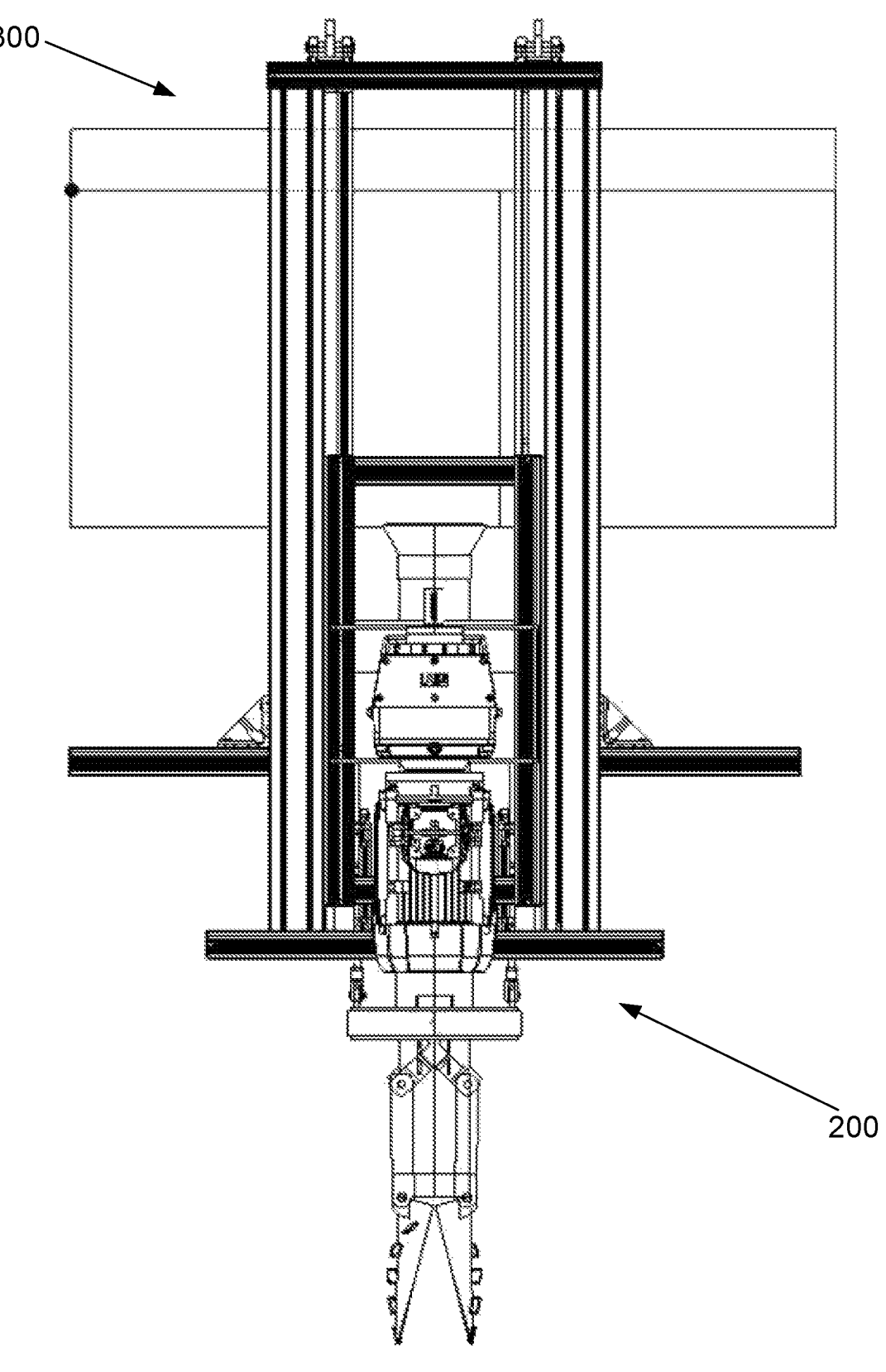
FIG. 5C is a back view of the example of the example of FIG. 5A.
Figure 5D:
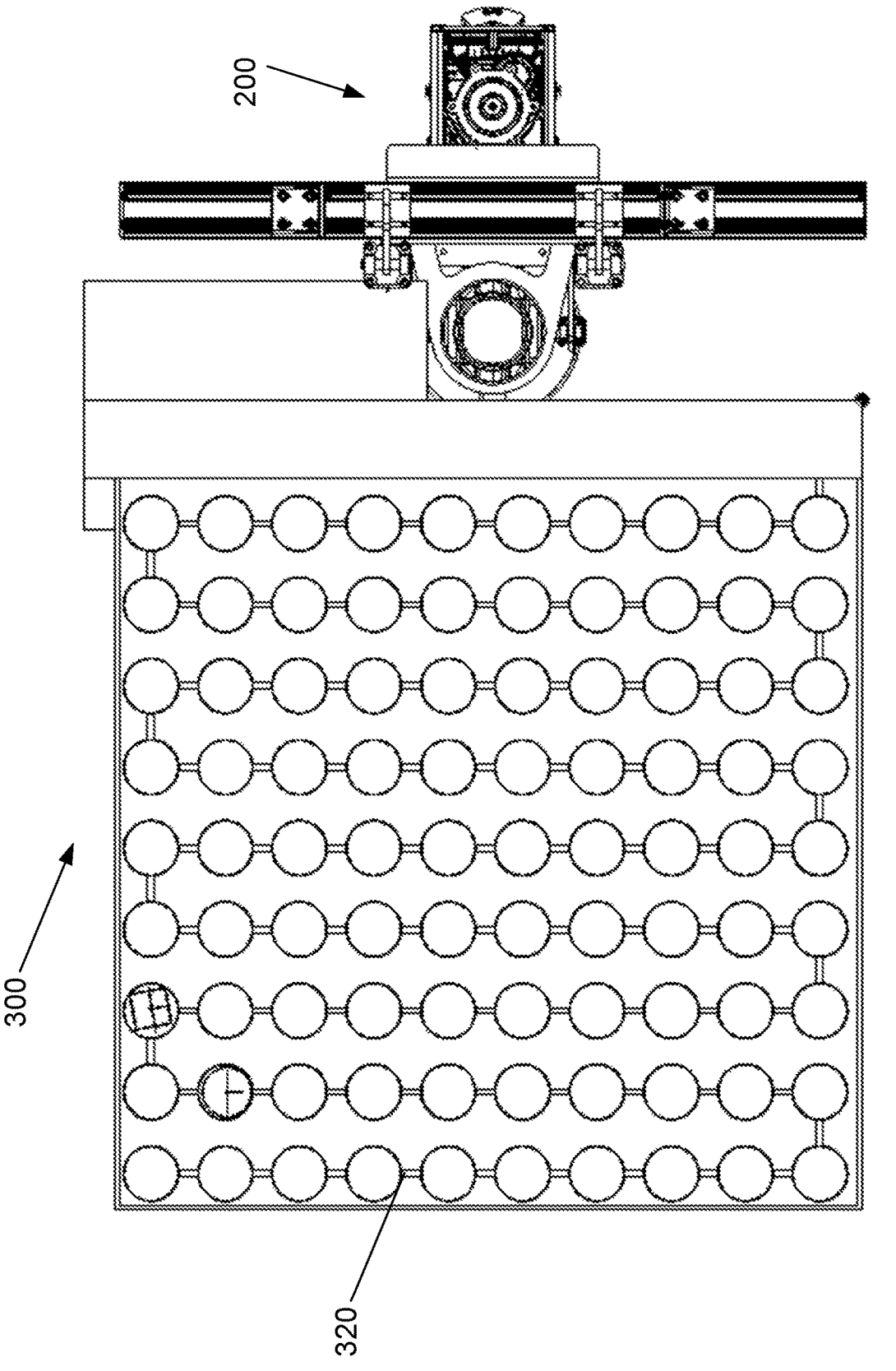
FIG. 5D is a plan view of the example of the example of FIG. 5A.
Figures 6A, 6B, 6C, 6D:
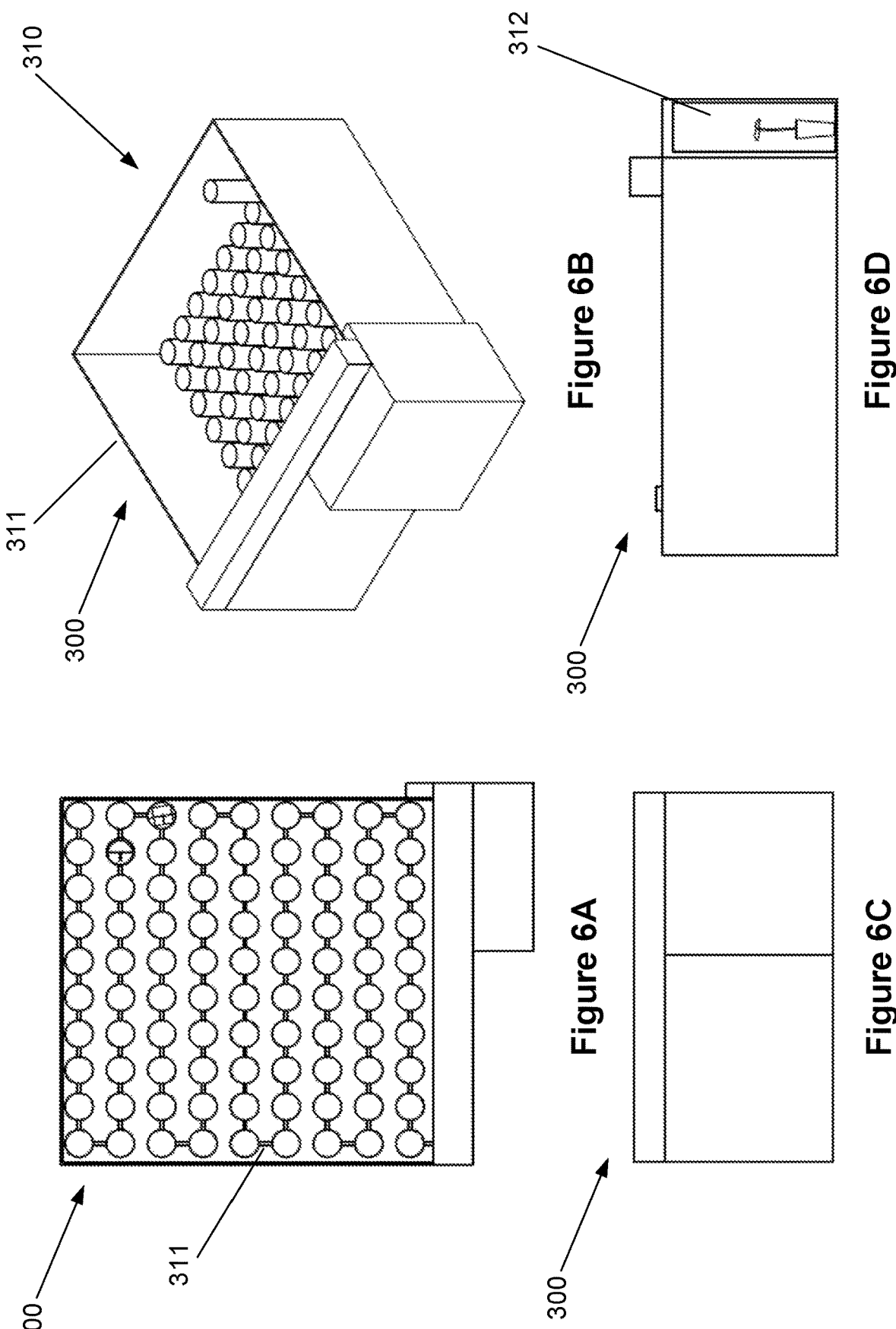
FIG. 6A is a plan view of the example dispensing apparatus of FIG. 5A.
FIG. 6B is a perspective view of the example of FIG. 6A.
FIG. 6C is an end view of the example of FIG. 6A.
FIG. 6D is a side view of the example of FIG. 6A.
Figure 6E:
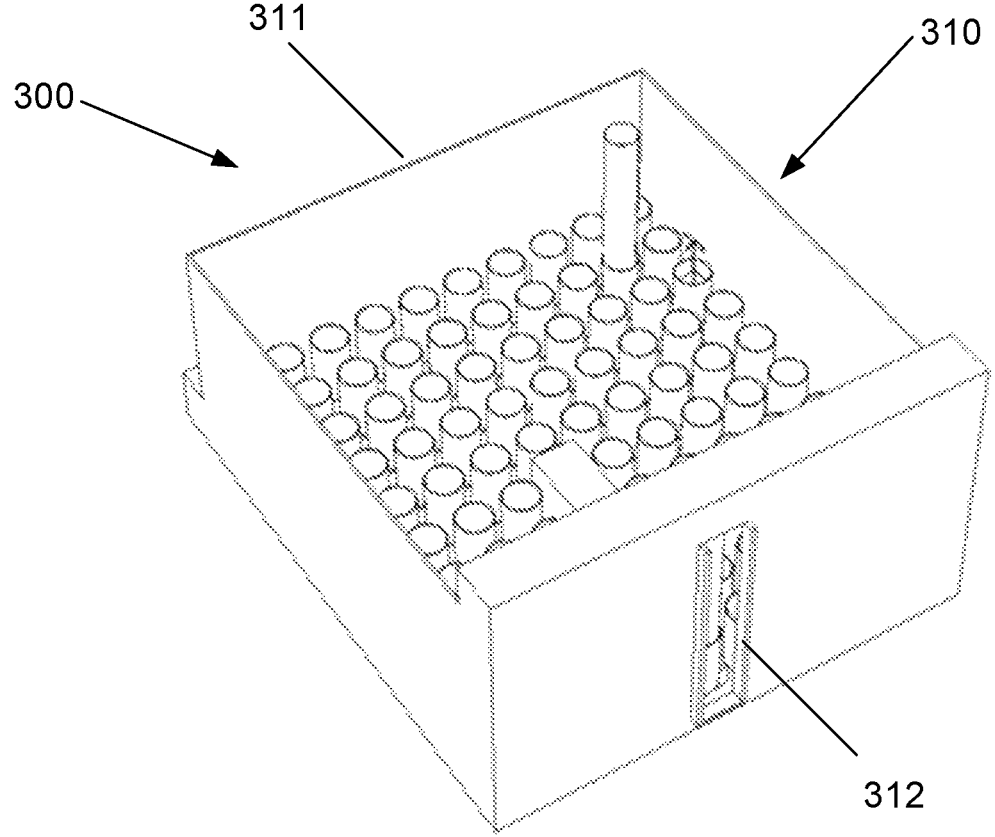
FIG. 6E is a perspective view of the example of FIG. 6A.

In particular, FIGS. 2A to 2C show an example of the drilling apparatus 200 in an extended and open configuration, FIGS. 3A to 3D show the drilling apparatus 200 in an extended and closed configuration, and FIGS. 4A to 4D show the drilling apparatus 200 in a retracted and closed configuration.

During stowage and transport, typically the drilling apparatus 200 is in the retracted and closed configuration.

In use, the drilling apparatus 200 is positioned such that the closed drill head 210 is aligned with the desired position of the hole. The motor 230 is operable to rotate the guide 260 and drill head 210. The rotating drill head 210 is displaced toward the desired position of the hole via the displacement actuator 240. Accordingly, the closed drill head 210 is operable to drill the hole, penetrating the ground, breaking up and aerating the soil during drilling. Once sufficient hole depth is achieved, the opening actuator 250 is operable to open the opposing jaws 211.1, 211.2 of the drill head 210 and release the plant into the hole. Subsequently, the drill head 210 is retracted from the hole while remaining open, allowing the aerated soil to settle at the sides of the planted plant. In this regard, the drill head 210 may remain rotating throughout the planting process, or alternatively, may stop rotating after sufficient depth is achieved prior to planting the plant.

In some examples, after planting and retraction of the drill head 210, the drill head may be extended again to compact soil around the planted plant, thus securing the plant and ensuring optimal root and soil contact. However, this is optional.

As will be appreciated, plants can be delivered to the drill head 210 at any point during the process.

An example of a dispensing apparatus for storage and dispensation of a plurality of plants for planting will now be described with reference to FIGS. 5A to 5D. In this example, the dispensing apparatus 300 is mounted to the drilling apparatus 200 of the abovementioned example, however this is not essential. In other examples, the dispensing apparatus may be used in any appropriate plant dispensation arrangement.

The dispensing apparatus 300 includes a compartment 310 for supporting the plants P, the compartment 310 include an inlet 311 for receiving the plants P, and an outlet 312. In addition, the apparatus 300 includes an actuator 320 operable to selectively dispense the plants from the outlet 312.

Advantageously, the dispensing apparatus 300 allows a plurality of plants to be transported and stored in a single apparatus 300, saving labour and transportation logistics which require plants to be moved between a vehicle and planting location(s). Additionally, when used in conjunction with the drilling apparatus 200 described herein, or similar arrangement, the outlet 312 can provide the plant at the location of planting, saving labour and manual tasks which require manual strength and repetitive operations which can lead to strain and injury.

In some examples, the dispensing apparatus 300 includes a conveyor 320 to convey the plants towards the outlet 312.

The conveyor in this regard is typically actuated by the actuator. In this respect, plants and/or plants housed in the apparatus for supporting a plant as described in any of the examples herein, may be conveyed along the conveyor 320 toward the outlet 312 and selectively dispensed at suitable times.

While any suitable arrangement of dispensing apparatus 300 may be used, in this example, the compartment 310 includes an open compartment with the opening defining the inlet 311. The compartment 310 is formed from a rectangular base with four walls extending therefrom, thereby defining the open compartment. In other examples, any suitable shape of compartment may be used and this will be discussed further below.

The actuator 320 is operable to control the conveyor 320 which is positioned on the base of the compartment 310. The conveyor 320 is arranged to move at parallel lengths of the base, however in other examples the conveyor 320 may run in a substantially spiral shaped manner, or the like.

In use, plants or apparatus supporting plants, is placed in the compartment 310 via the inlet 311, and along the length of the conveyor 320. The conveyor 320 is then actuated to selectively convey the plants into the outlet 312 for dispensation. In the example shown, the outlet is positioned above the plant guide 260 of the drilling apparatus 200, and thus plants are accordingly guided into the drill head 210 for planting, without the need for operator lifting or transport.

However, the conveyor 320 is optional and other arrangements for selective dispensation may be used.

FIGS. 6A to 6E show the dispensing apparatus 300 of FIGS. 5A to 5D in additional views.

A further example of a dispensing apparatus 300 for storage and dispensation of a plurality of plants for planting will now be described with reference to FIGS. 7A to 7E.

The dispensing apparatus 400 of this example includes a compartment 310 for supporting the plants P, the compartment 410 include an inlet 411 for receiving the plants P, and an outlet 412. In addition, the apparatus 400 includes an actuator 420 operable to selectively dispense the plants from the outlet 412.

In a further example, plants are included in apparatus for supporting the plants (such as described herein). A plurality of plants in such apparatus are be coupled via a biodegradable link 420, and arranged in the compartment 410 of the dispensing apparatus 400. The actuator in this example acts to position successive apparatuses in the outlet 412, severing the respective link, and dispensing the plant.

Figures 7A, 7B, 7C, 7D:
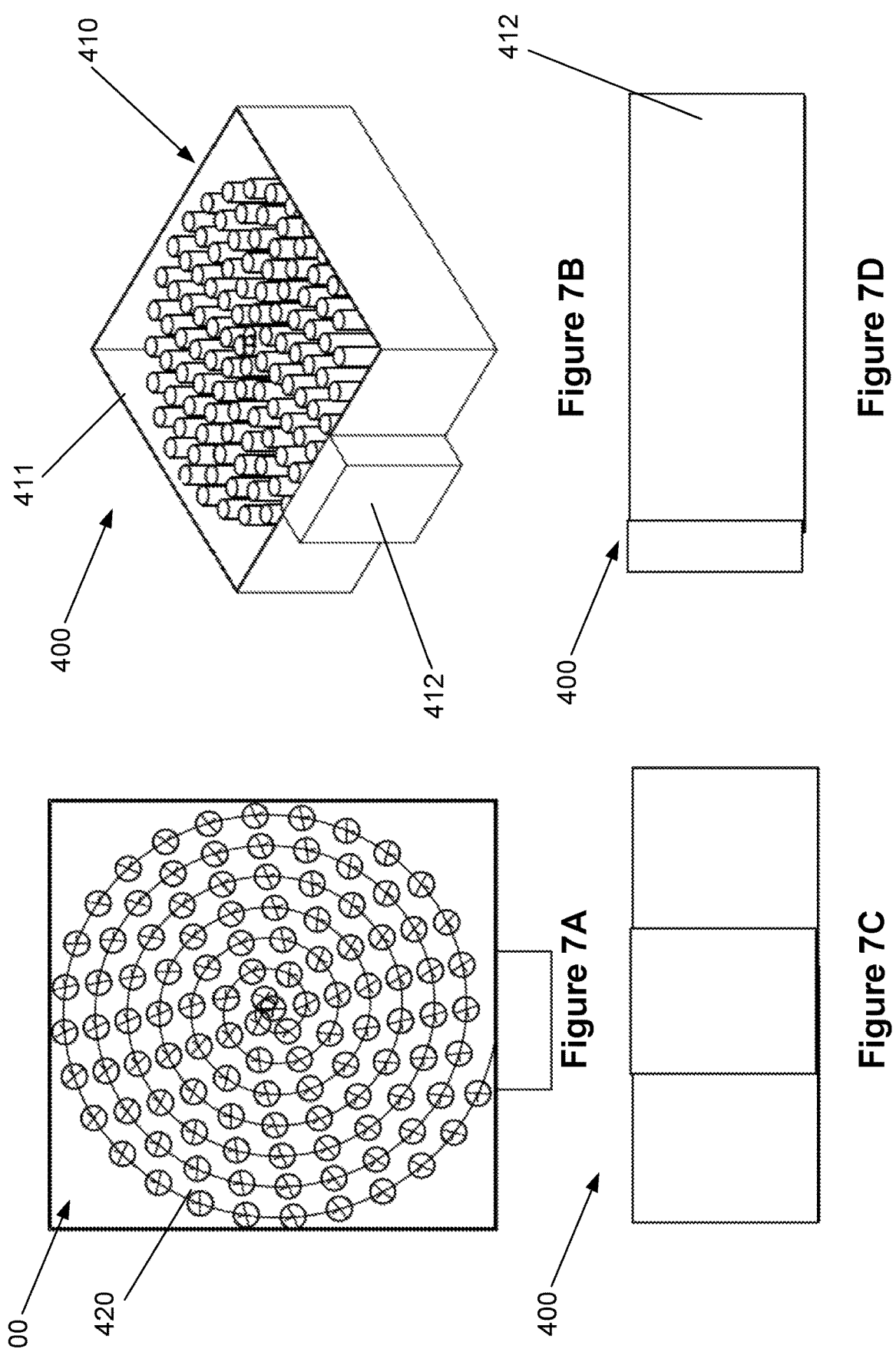
FIG. 7A is a schematic diagram in plan view of a further example of a dispensing apparatus for storing and dispensing a plurality of plants.
FIG. 7B is a perspective view of the example of FIG. 7A.
FIG. 7C is an end view of the example of FIG. 7A.
FIG. 7D is a side view of the example of FIG. 7A.
Figure 7E:
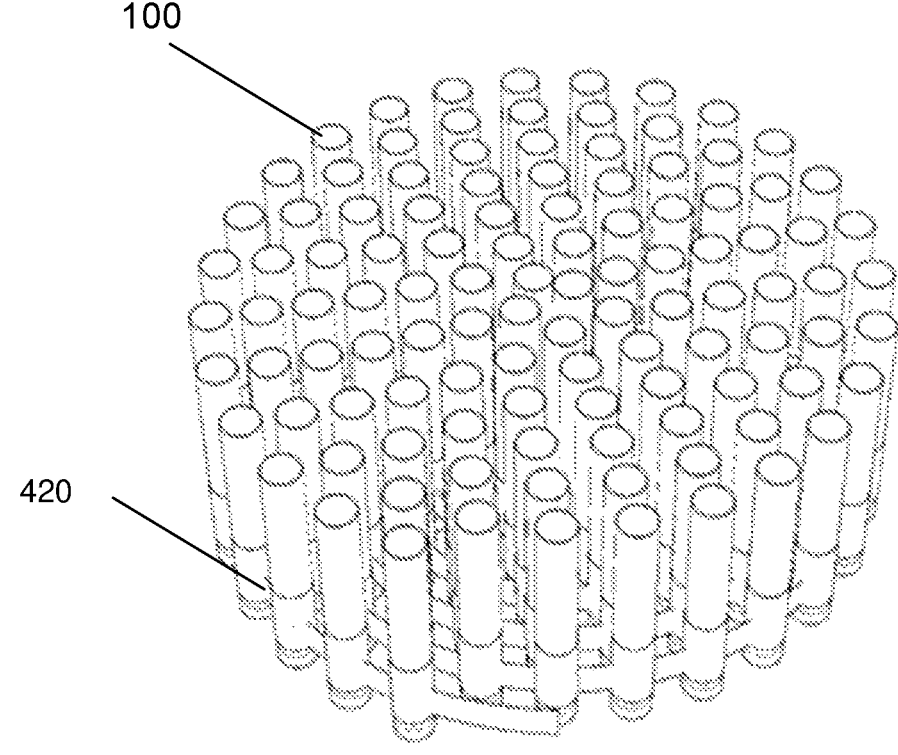
FIG. 7E is a perspective view of the example of FIG. 7A.

Links 420 may be formed in any appropriate manner, and FIG. 7E shows one example of a plurality of apparatuses for supporting a plant 100 (as described in any of the examples herein) coupled via a plurality of links 420.

A further example of a dispensing apparatus 500 for storage and dispensation of a plurality of plants for planting will now be described with reference to FIGS. 8A to 8F.

The dispensing apparatus 500 of this example includes two compartment 510.1, 510.2 for supporting the plants P, the compartments 510.1, 510.2 include an inlet for receiving the plants P, and an outlet 512. In addition, the apparatus 500 includes actuators 523 operable to selectively dispense the plants from the outlet 512.

In this example, the dispensing apparatus 500 includes a cover. This is advantageous for protecting the plants from inclement weather or damage from animals, as well as reducing evaporation from the plants.

The apparatus 500 includes a slideably mounted dispensation drawer 513 which laterally guides plants from the compartment 510 to the drill guide 260 of the drilling apparatus 200 via an outlet 512 defined in the base of the drawer 513.

In addition, the compartments 510.1, 510.2 include slideably mounted plant guides 521 where the plant guide 521 receives and laterally support the plants for storage and dispensation. The plant guides 521 guide lateral movement of respective plants within the compartment toward the dispensation drawer 513. In this respect, the plant guides 521 slide along rails within the compartment which complement the rails 522 provided on sides of the guides 521.

Further to the above, the plant guides 521 are mounted over shelves 531, 532 within the compartment 510 which support the plants within the guides 521. The shelves 531, 532 define a channel 540 therebetween. As plants in the plant guides 521 slide over the channel 540, they drop into the dispensation drawer 513 for actuation toward the outlet 512 and drilling apparatus 200.

The actuators 523 in this example are configured in the manner of a linear rack and pinion, however any suitable actuator to induce linear movement of the plant guides 521 and/or dispensation drawer 513 may be used. In particular, the rack and pinion actuate selective slidable movement of a plant guides 521 and dispensation drawer 513.

While a single plant guide 521 is shown in the example of FIGS. 8A to 8F, multiple plant guides 521 may be included. Moreover, multiple layers of shelving 531, 532 may be included, and this will be discussed further below.

Figure 8A:
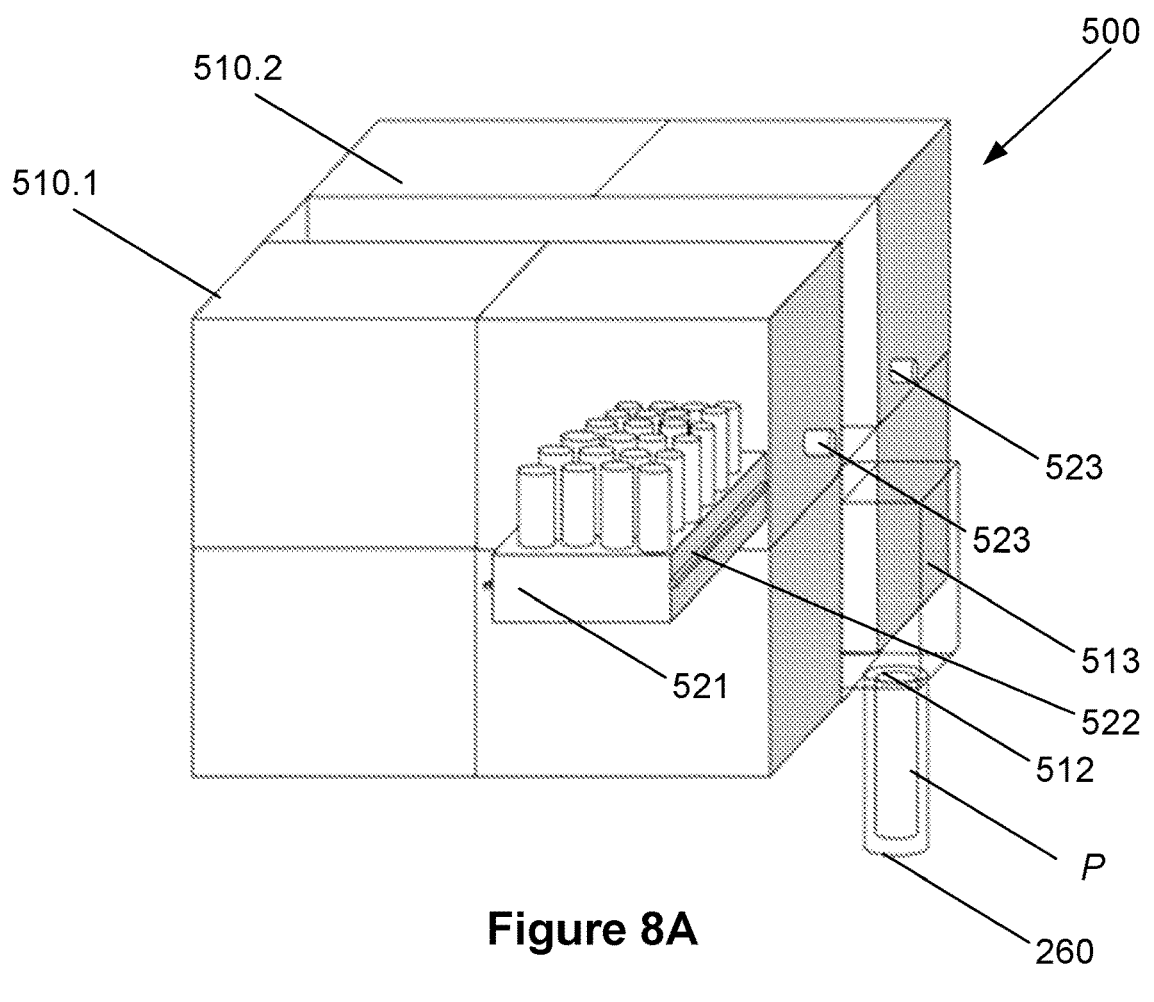
FIG. 8A is a schematic diagram in perspective view of a further example of a dispensing apparatus for storing and dispensing a plurality of plants.
Figure 8B:
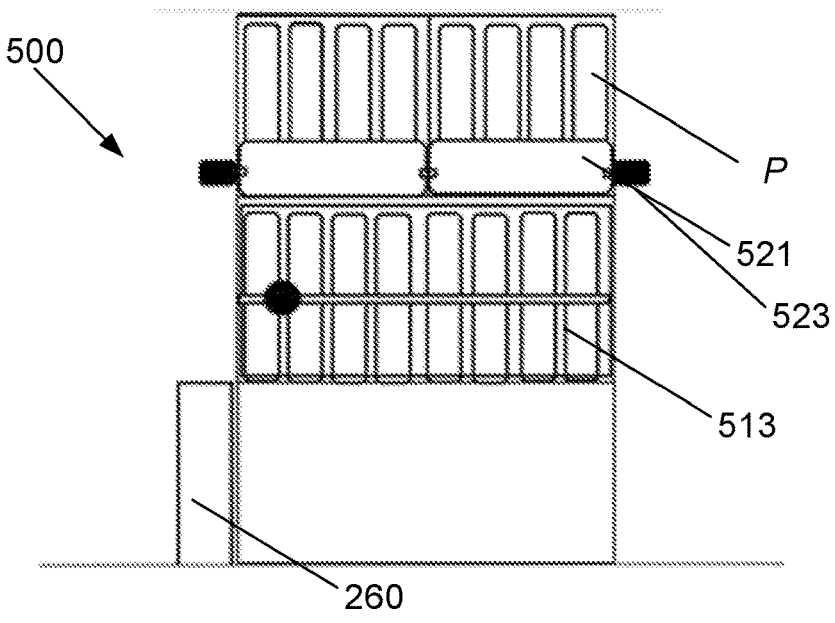
FIG. 8B is a side view of the example of FIG. 8A.
Figure 8C:
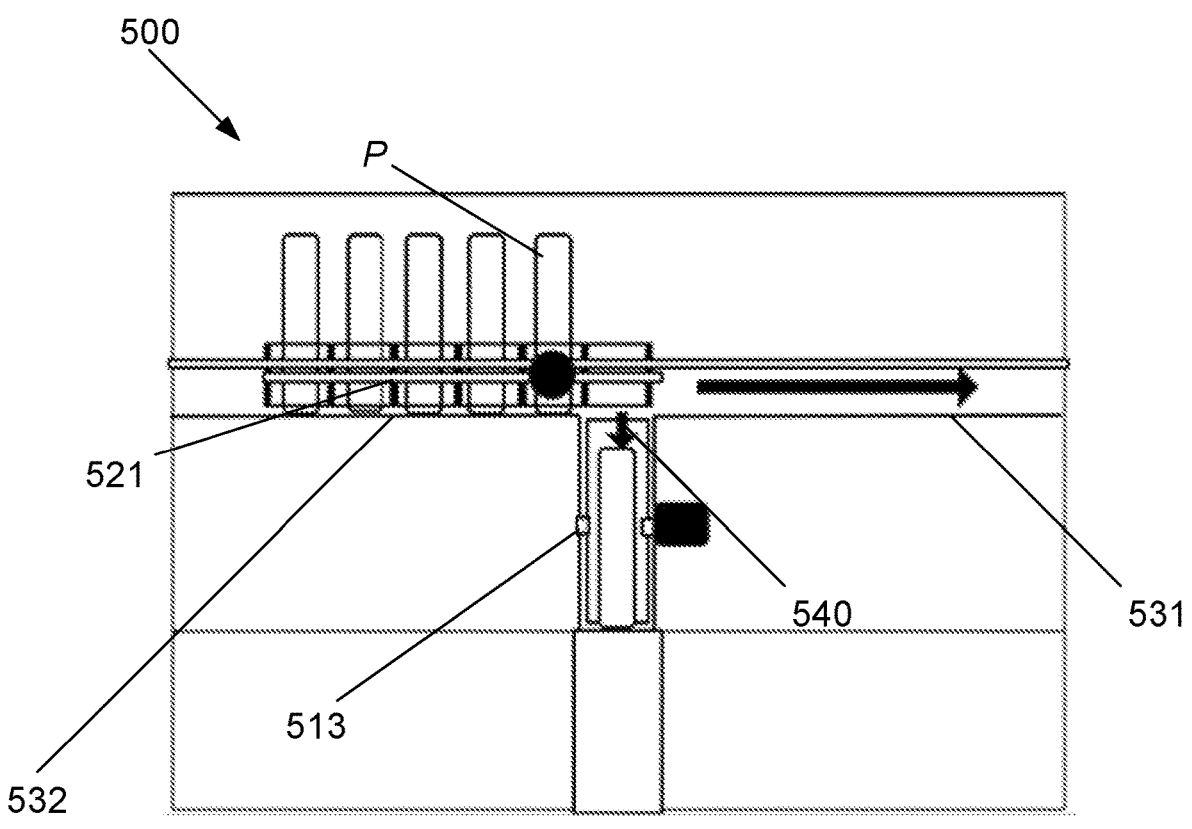
FIG. 8C is a cross-sectional view of a layer of the example of FIG. 8A.
Figure 8D:
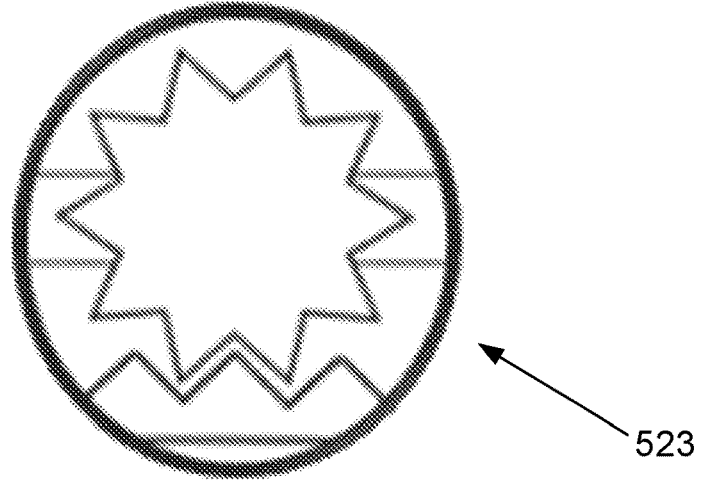
FIG. 8D is a cross-sectional view of an actuator of the example of FIG. 8A.
Figure 8F:
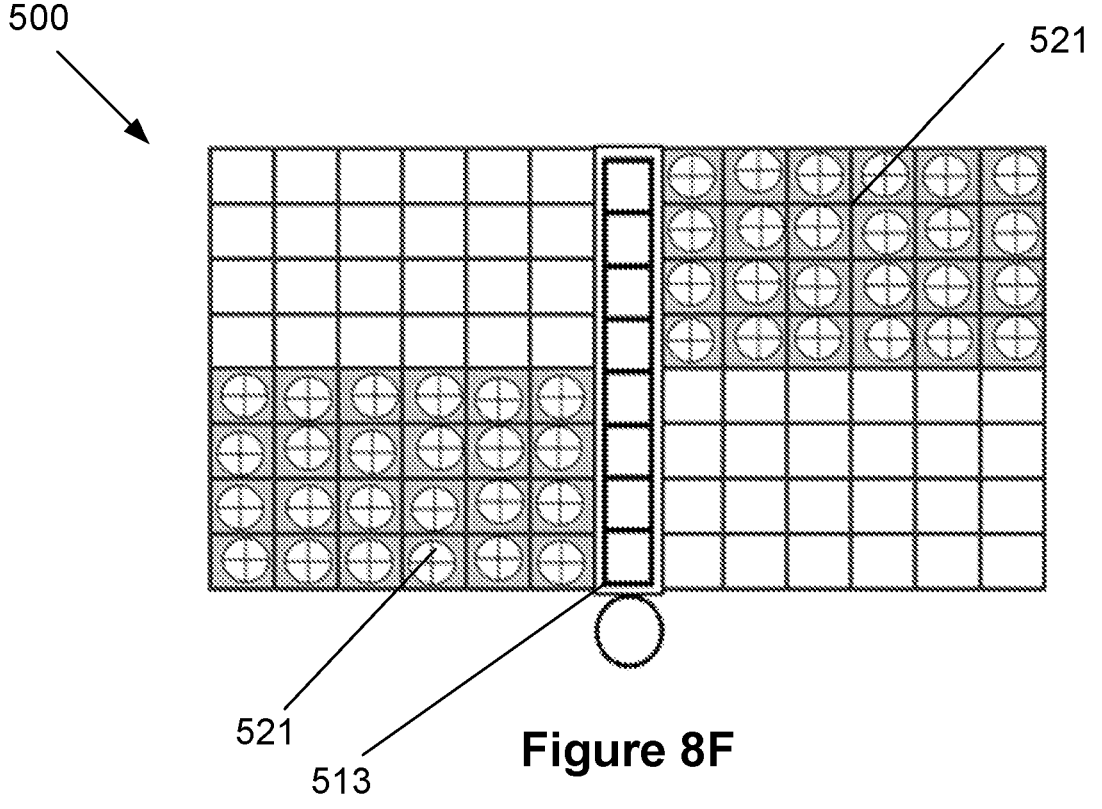
FIG. 8F is a plan view of the example of FIG. 8A.

In use, plant guides 521 may be included on opposing sides of the dispensation drawer 513 as shown in FIG. 8F. Inward movement of the plant guides 521 drops successive rows of plants into the dispensation drawer 513 via the channel 540. Subsequent, the dispensation drawer 513 moves outwardly from the apparatus 500, dropping successive plants from the drawer 513 into the drilling apparatus 260 via the outlet.

In some examples, it may be advantageous to include two layers of shelves 531.1, 531.2, 532.1, 532.2, and this is shown in FIGS. 8G to 8I. Similar features in this example are labelled with correspondingly similar reference numerals.

In this example, the top layer is defined by shelves 532.2, 531.2 and bottom layer is defined by shelves 532.1, 531.1. Accordingly, the shelves 531.1, 531.2, 532.2, 532.2 define the channel 540 centrally therebetween. The plant guides 521 in this example are arranged on opposing shelves of respective shelves 531.1, 531.2, 532.2, 532.2 as shown in FIGS. 8H and 8I. This can be particularly beneficial in some instances. For example, such an arrangement can facilitate aerial drone delivery of plant guides 521 into respective shelves 531, 532.

Figure 9:
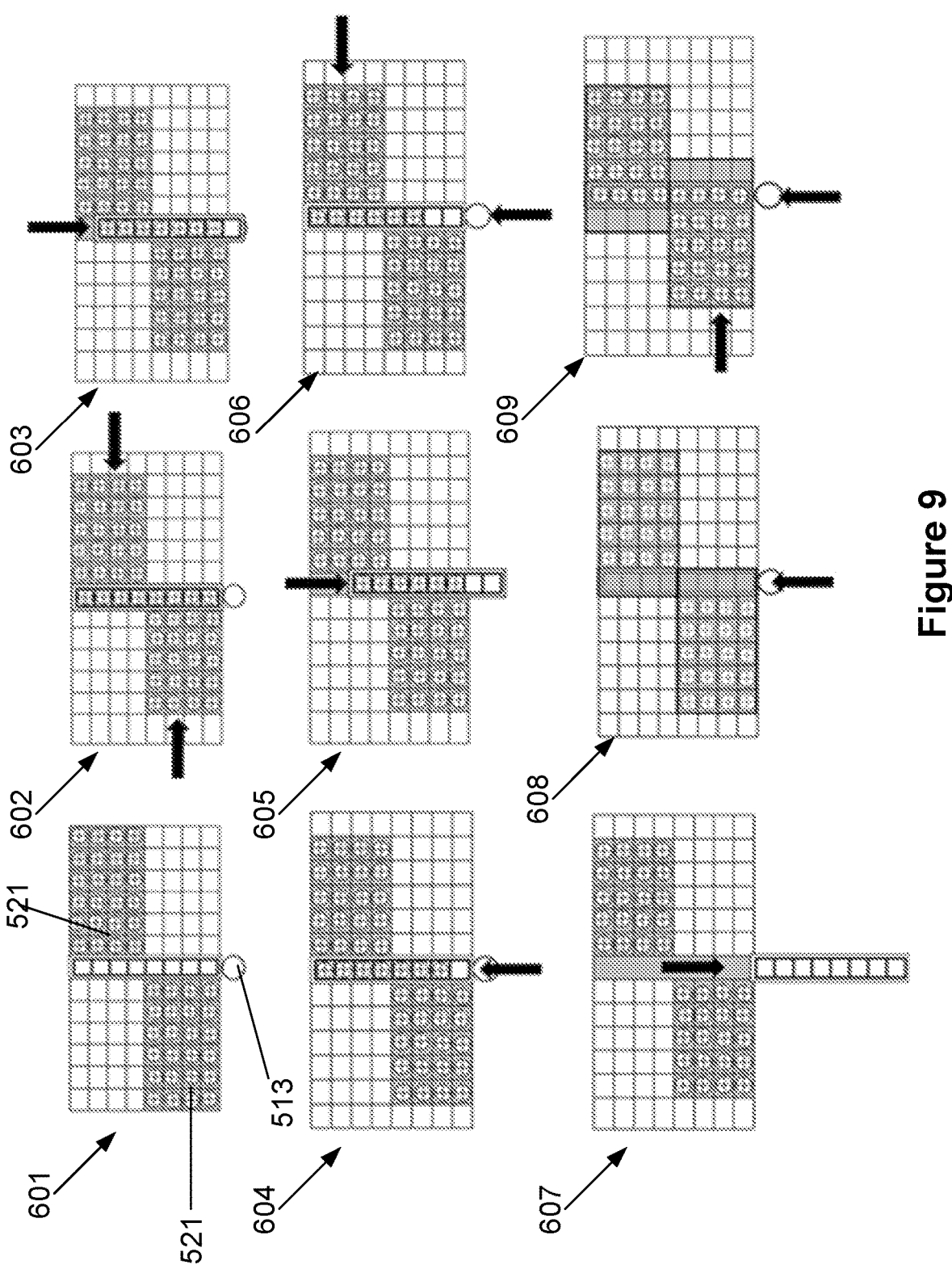
FIG. 9 is schematic diagrams of a plan view of the example of FIG. 8A in use.

An example of two plant guides 521 and a dispensation drawer 513 of any of the examples herein will now be described in use within a dispensing apparatus 500, with reference to FIG. 9.

At 601 plants are loaded into two plant guides 521 which are on opposing sides of the channel 540 defined between shelves. At 602, actuators slideably move the plant guides 521 inwardly, such that plants in a first row of the plant guides 521 fall into the dispensation drawer 513 via the channel 540.

While 24 plants per plant guide 521 are shown in this example, and 8 plants in the dispensation drawer 513, it will be appreciated that the dispensing apparatus 500 may be configured to hold any suitable number of plants.

At 603 the dispensation drawer 513 is actuated to slideably move outwardly from the compartment 510 of the apparatus, thereby allowing one plant to drop from the aperture in the base of the drawer 513 into the drill guide and/or drilling apparatus for dispensation, as shown in 604.

At 605, the dispensation drawer 513 is actuated again to slideably move outwardly in order to expose another plant to the outlet for dispensation at 606. Steps 605 and 606 are repeated until all plants are dispensed from the dispensation drawer as shown at 607.

At 608 the dispensation drawer 513 is slideably actuated to return to the compartment 510. Subsequently, the plant guides 521 are actuated to move inwardly again in order to guide the second row of plants into the dispensation drawer 513 via the channel 540 for dispensation. The process described above can be repeated until the plant guides 521 have dispensed all of their respective rows of plants.

Figure 13:
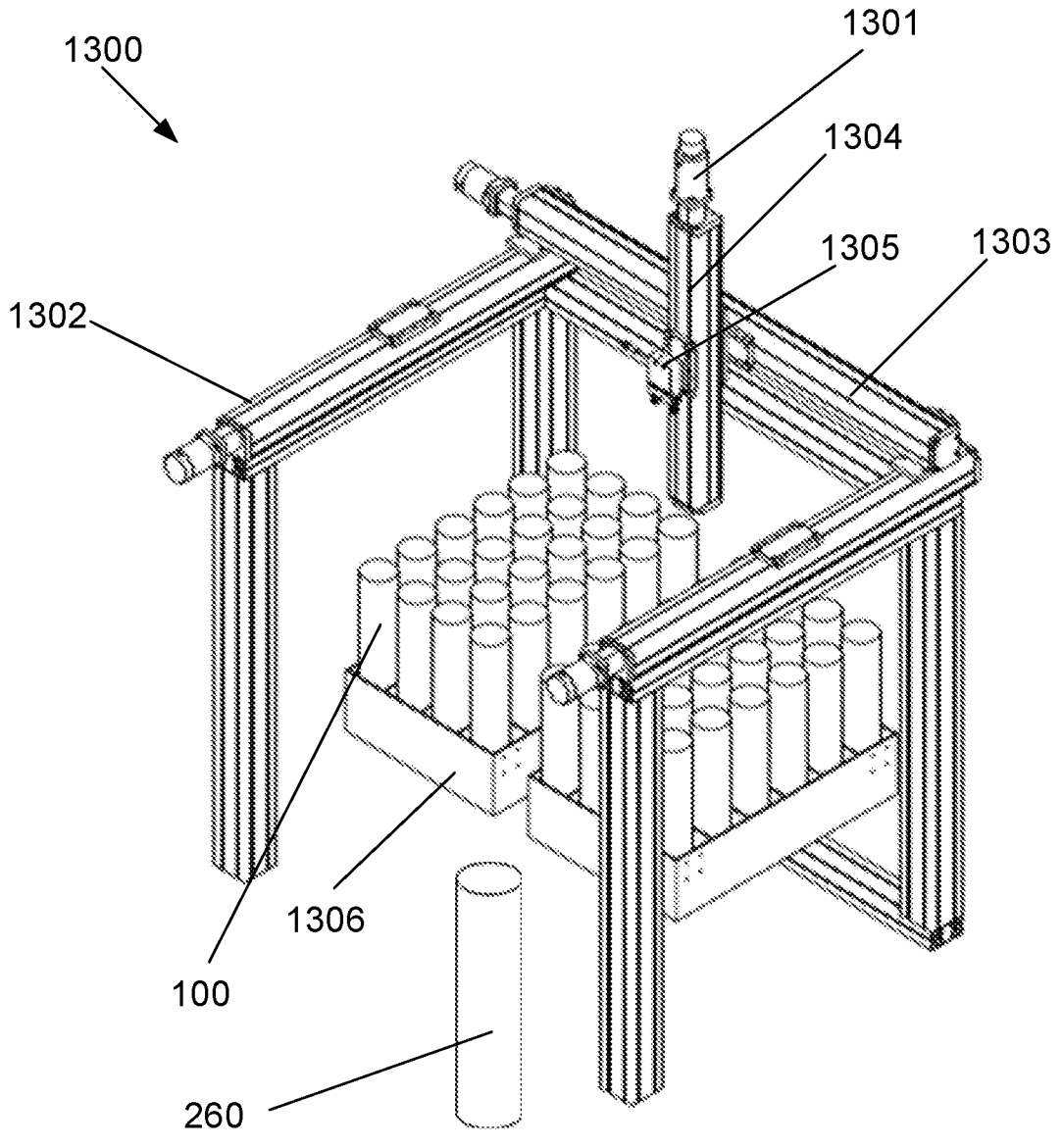
FIG. 13 is a schematic diagram of a perspective view of a further example of a dispensing apparatus for storing and transporting a plurality of plants.

A further example of a dispensing apparatus 1300 for storage and dispensation of a plurality of plants for planting will now be described with reference to FIG. 13.

In this example, the dispensing apparatus 1300 includes a cartesian robot, also referred to as an xyz-gantry robot or xyz-gantry. In this example, the dispensing apparatus 1300 includes x, y, and z axis sliding rails 1302, 1303, 1304, for selectively positioning the selector 1305. Motors operate in accordance with each of the rails 1302, 1303, 1304 and selector 1305 in order to actuate their respective movement in accordance with input commands. For example, z axis motor 1301 selectively positions the selector 1305 along the z axis sliding rail 1304.

The selector 1305 can include a gripper or other suitable arrangement for moving a selected plant and/or apparatus for supporting a plant 100 from its location in a rack or tray 1306 into the drilling apparatus, such as into the guide 260 of the drilling apparatus described herein, to thereby be planted.

In use, plants, trees and/or apparatus for supporting plants 100 can be arranged in trays or racks under the xyz gantry. Motors move the x, y and z sliding rails 1302, 1303, 1304 to selectively position the z axis sliding rail above or adjacent the selected plant (also referred to as the payload). Motor 1301 positions the selector 1305 along the z axis sliding rail in a manner to be able to securely move the payload. For example, the selector 1305 could close or open to securely grip the payload.

Once securely gripped, the payload is moved toward the drill guide 260. In this regard, the z axis rail 1304 is moved upward, and the x and y axis rails 1302, 1303 are also moved in accordance with the position of the drill guide 260. Once the payload is suitably positioned with respect to the drill guide 260, the selector 1305 releases the payload, which is delivered to the drilling apparatus for planting.

Beneficially, the dispensing apparatus 1300 of this example provides three or more axes of movement, can provide accurate and repeatable movements, and may be scaled to many suitable lengths and volumes of plants. Additionally, gearboxes and motors can be sized in accordance with a required range of motion, weight of payload and desired speed(s). The apparatus 1300 may be suitable for light to heavy loads and may typically be inexpensive.

An example of a backfilling apparatus for use with a drilling apparatus for planting a plant will now be described with reference to FIGS. 14A to 16. In this example, the backfilling apparatus 1500 is mounted to the drill head 210 of any of the abovementioned examples/embodiments. In other examples, the backfilling apparatus 1500 may be mounted to the drill apparatus 200 of any of the abovementioned examples. In an example, the backfilling apparatus

1500 is supported by the frame 200. In other examples, the backfilling apparatus 1500 may be supported or configured in any suitable manner.

In the example shown in FIGS. 14A to 16, the backfilling apparatus is mounted on an upper surface of the annular bearing 253.

The backfilling apparatus 1500 includes a soil guide 1501, wherein in use the soil guide 1501 is operable to guide soil towards the plant which is planted by the drilling apparatus of any of the abovementioned examples/embodiments.

In an example, the soil guide 1501 includes a guide member 1502 adapted to guide the soil towards the plant, wherein the guide member 1502 is moveable to guide the soil towards the plant. In an example, the soil guide 1501 includes at least one arm 1503, wherein the at least one arm 1503 is moveable to move the guide member 1502.

In the preferred form, the soil guide includes opposing arms 1503 and guide members 1502.

The backfilling apparatus 1500 includes a guiding actuator 1504 operable to move the soil guide. The guiding actuator 1504 is operable to move the at least one arm 1503. In the example shown in FIGS. 14A to 16, a first end of the guiding actuator 1504 is mounted to a frame 1505 provided to the annular bearing 253. The frame 1505 comprises one or more brackets 1506 to which the first end of the guiding actuator 1504 is mounted.

In the preferred form, the guiding actuator 1504 is connected to each of the opposing arms 1503 to permit movement of the arms relative to each other. In other examples, the soil guide may be provided in any suitable arrangement, such that it guides soil towards at least one of the hole and plant which is planted in the hole drilled in the ground by the drill head 210 and/or apparatus 200. The soil that is guided by the soil guide 1501 may include the soil displaced by the drill head 210 during drilling of the hole.

Figure 14A:
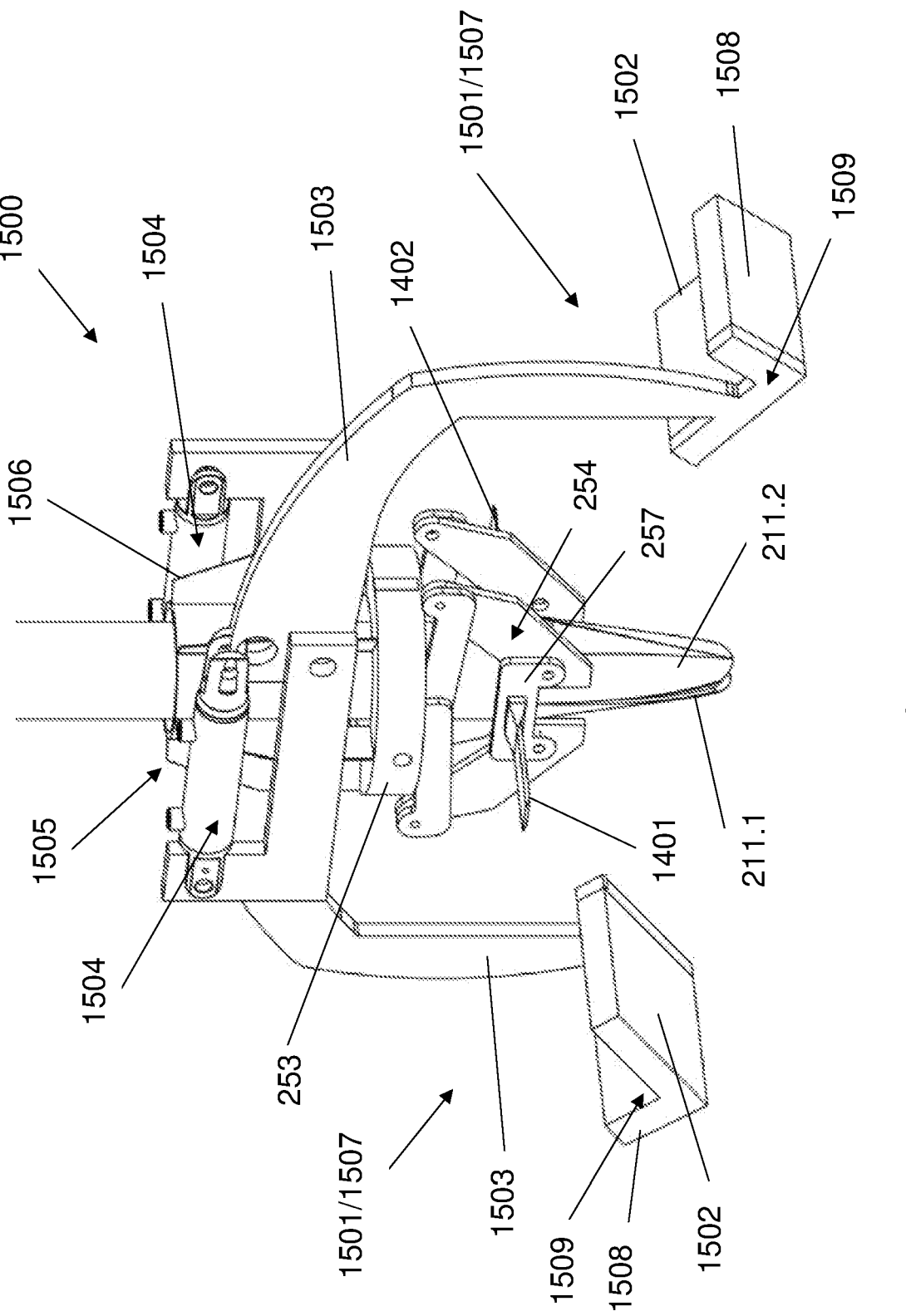
FIG. 14A is a schematic diagram in perspective view of an example of a backfilling apparatus for use with a drilling apparatus for planting a plant, in an open configuration, and which includes a cutter.
Figure 14B:
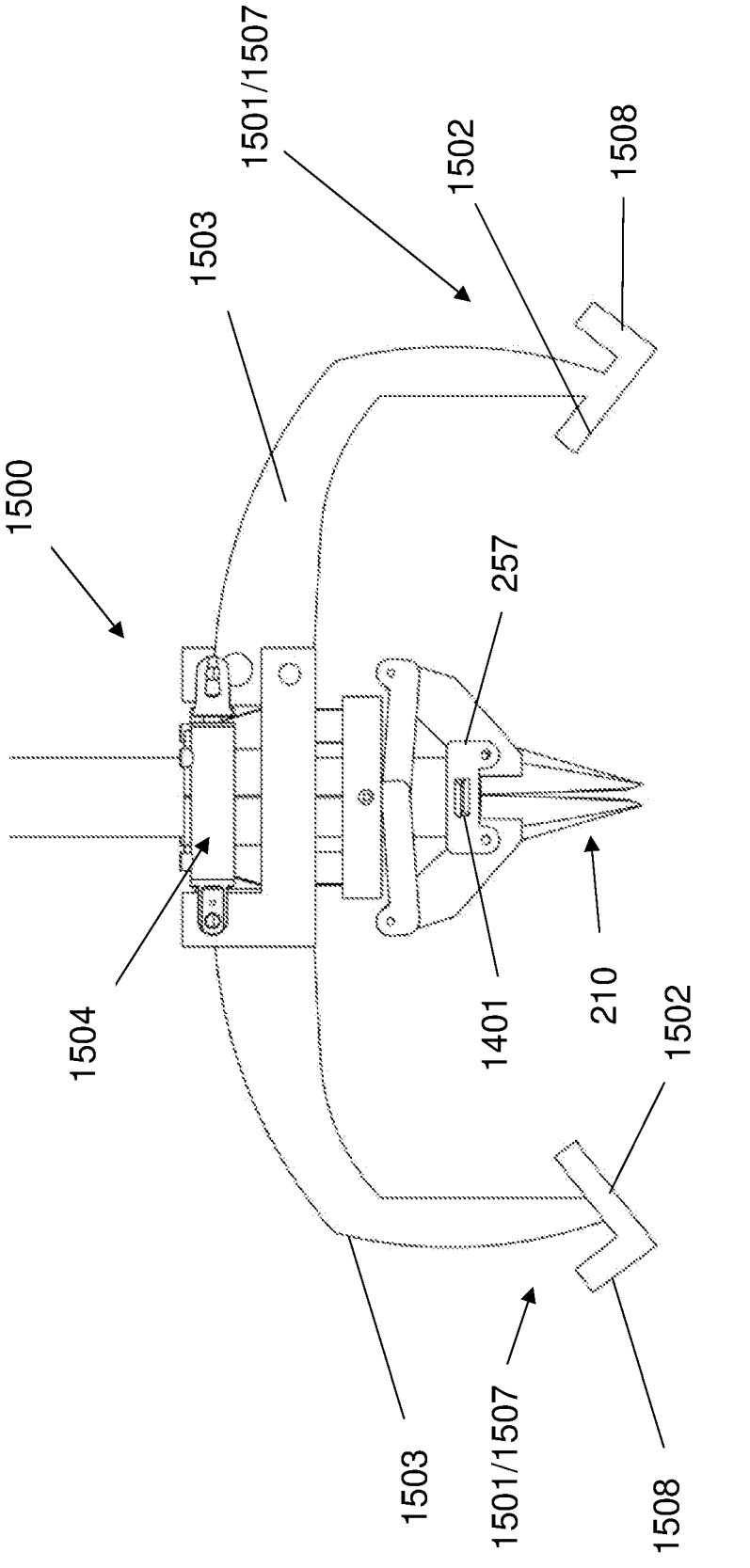
FIG. 14B is a front view of the example of FIG. 14A.
Figure 14C:
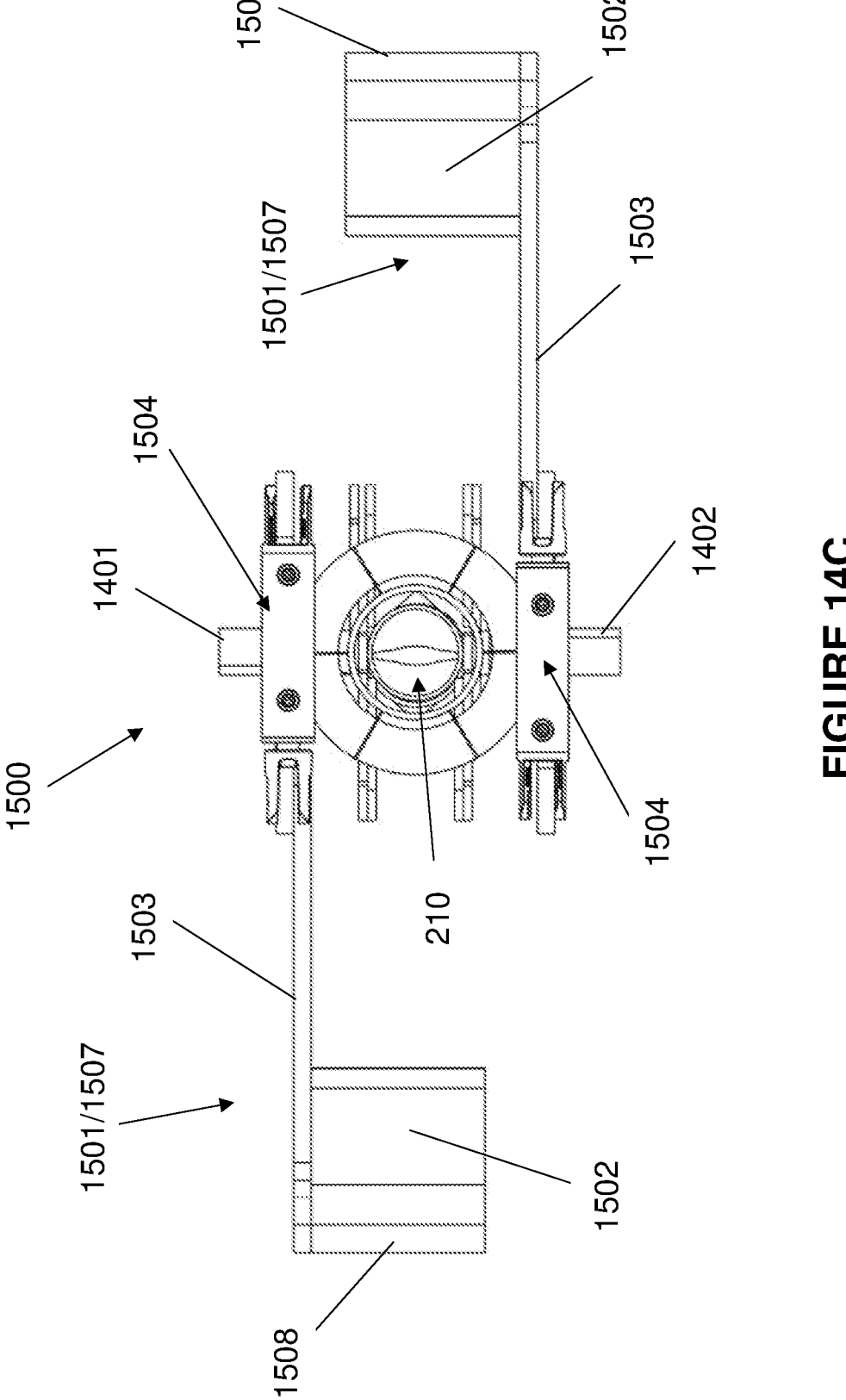
FIG. 14C is an end view of the example of FIG. 14A.
Figure 15A:
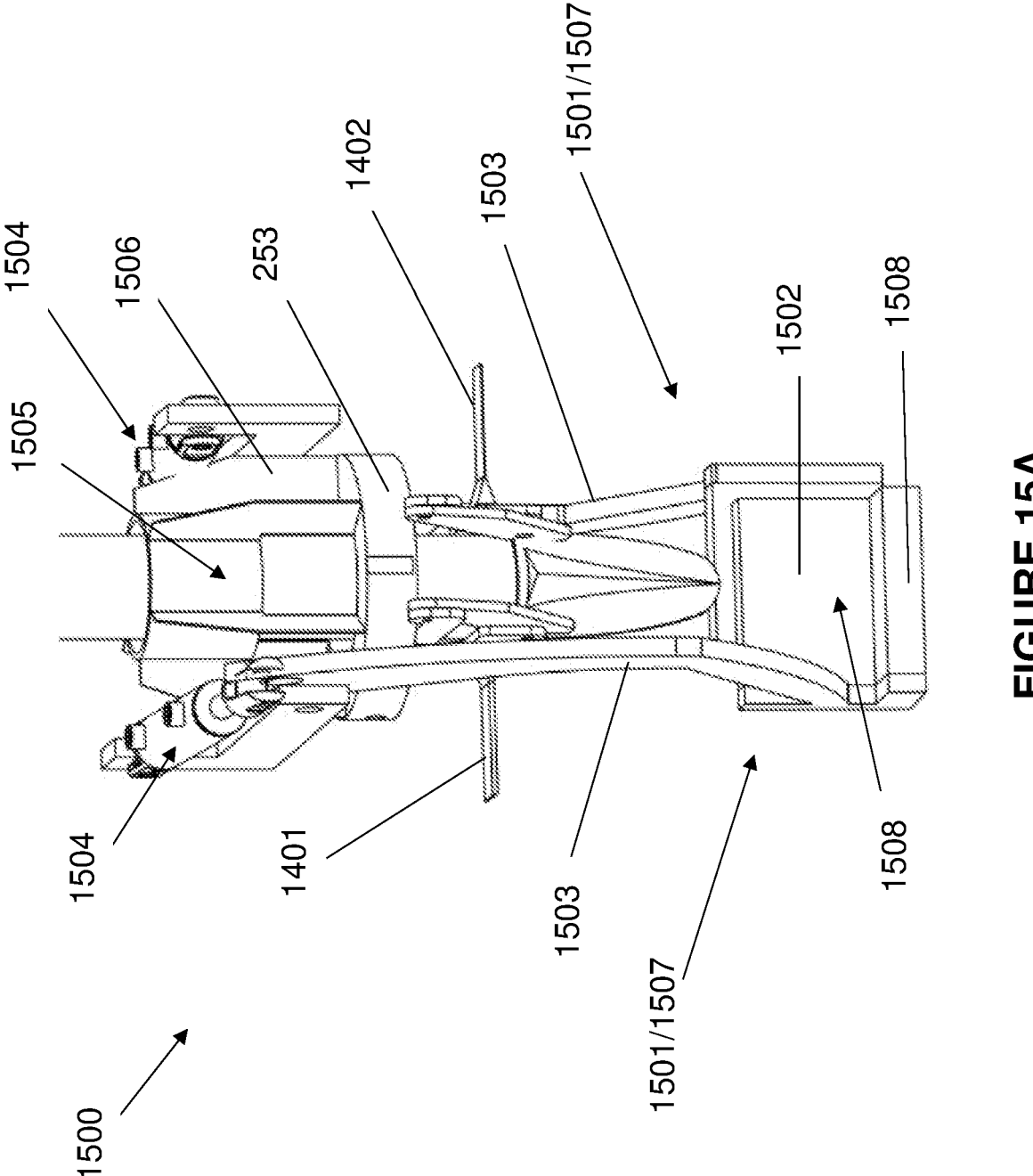
FIG. 15A is a first schematic diagram in perspective view of the example of FIG. 14A, in a closed configuration.
Figure 15B:
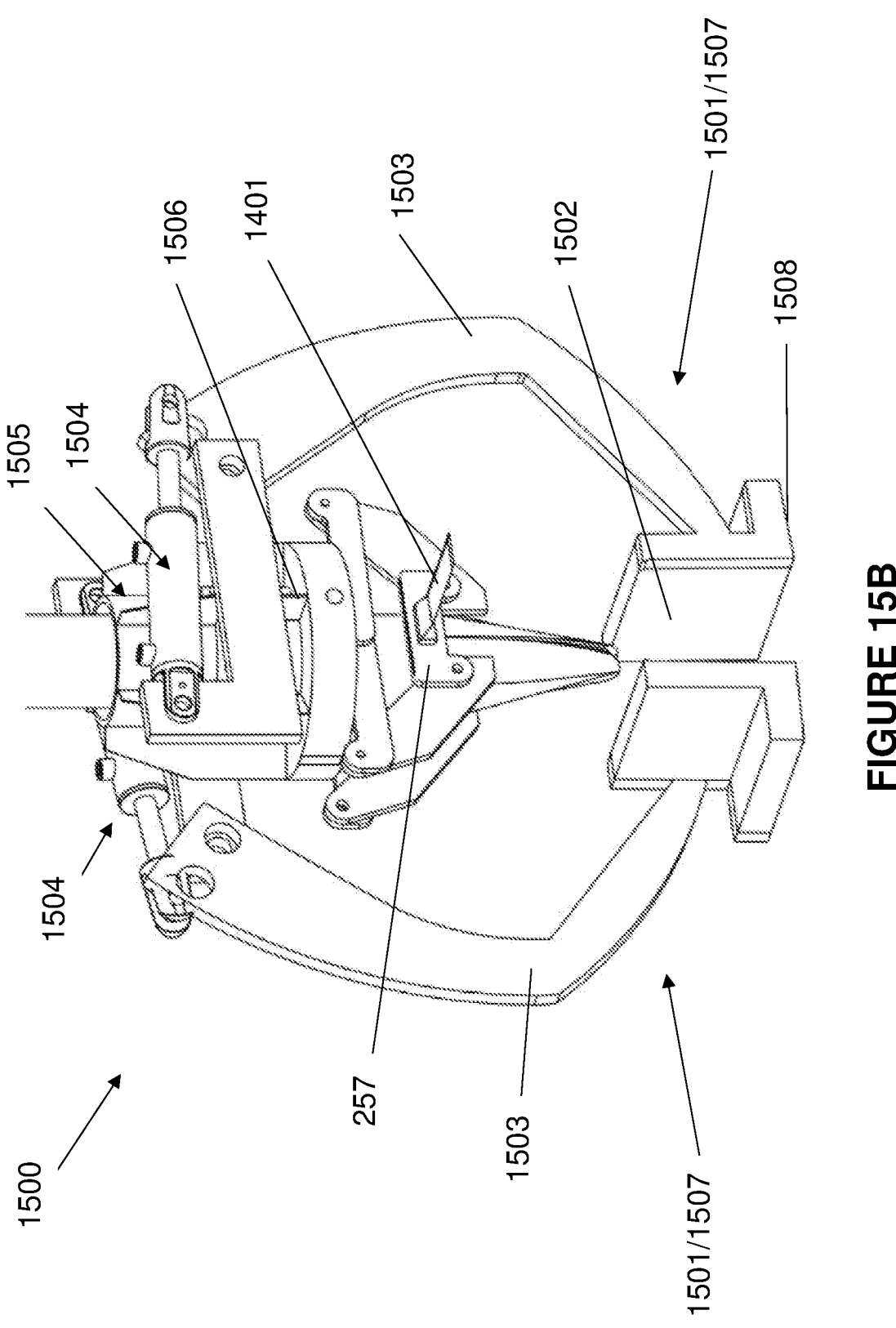
FIG. 15B is a second schematic diagram in perspective view of the example of FIG. 15A.
Figure 15C:
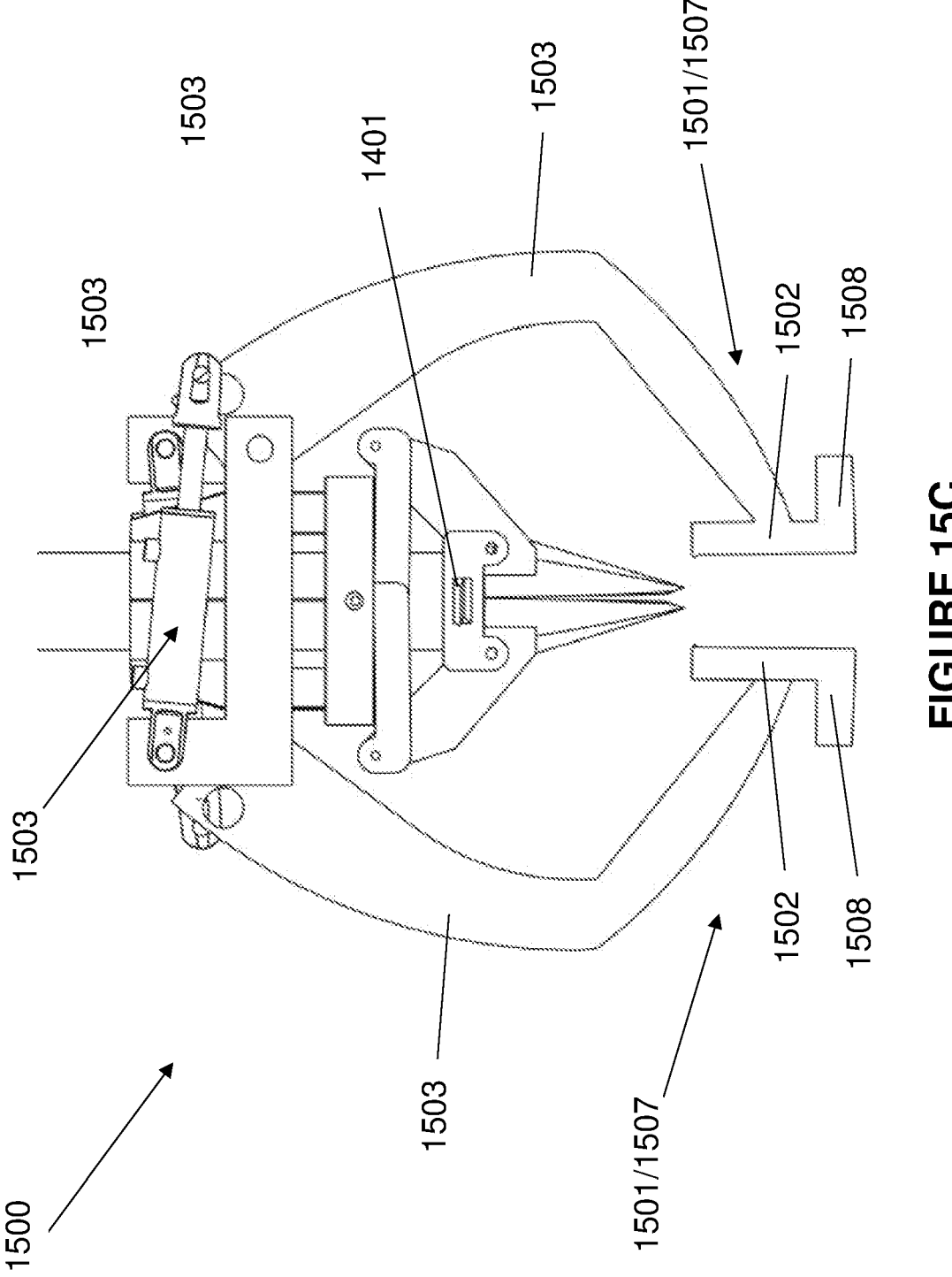
FIG. 15C is a front view of the example of FIG. 15A.
Figure 15D:
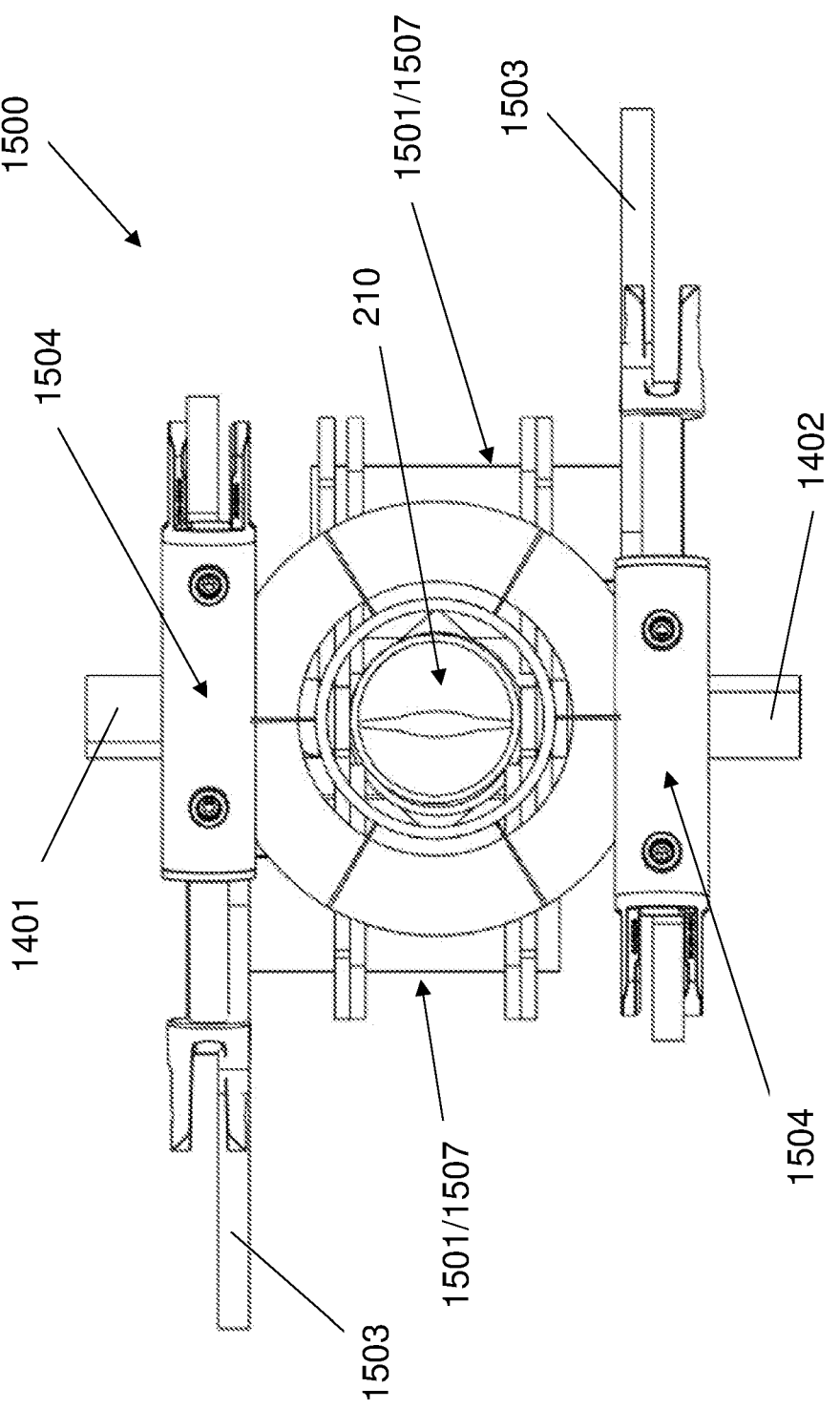
FIG. 15D is an end view of the example of FIG. 15A.
Figure 16:
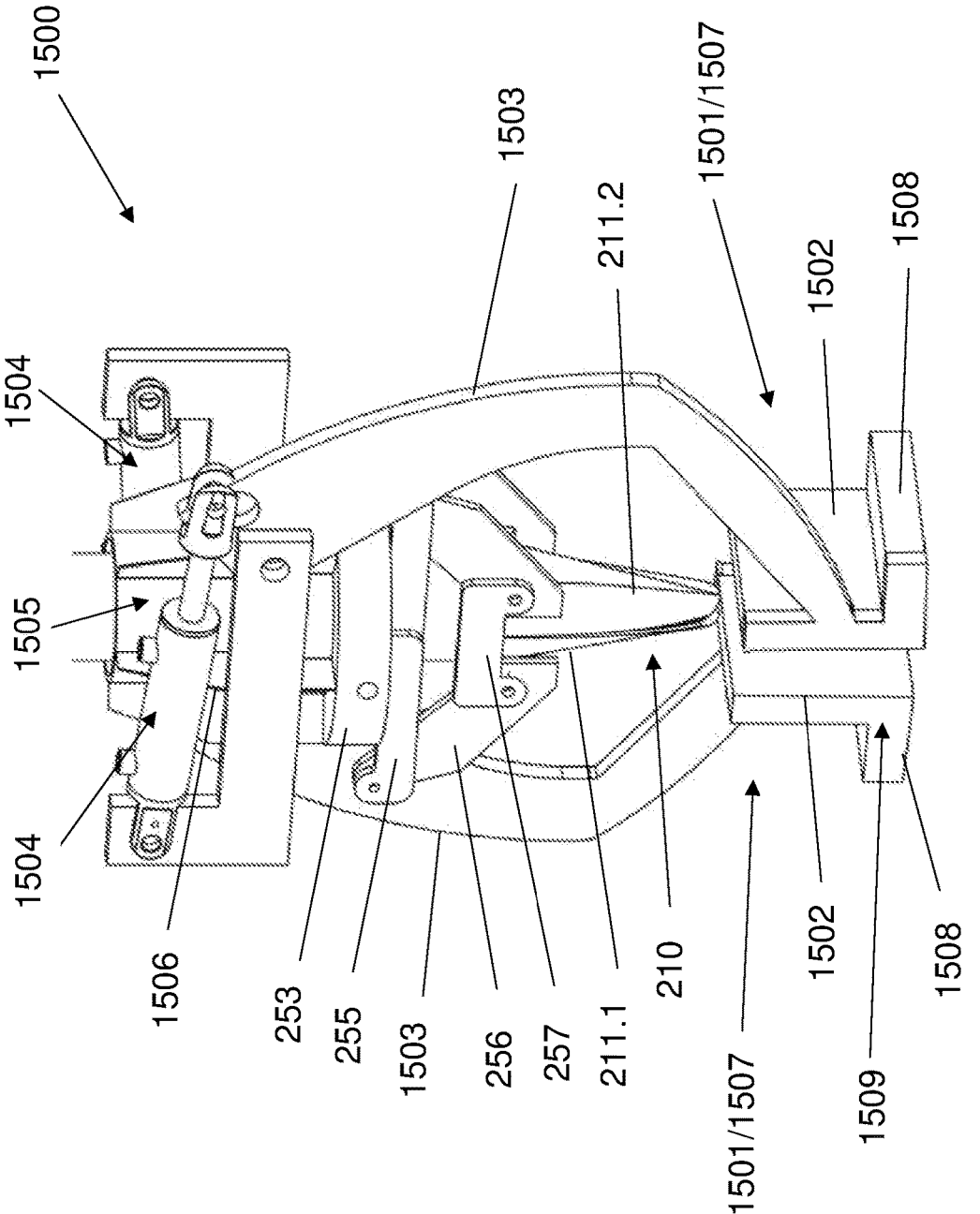
FIG. 16 is a schematic diagram in perspective view of an example of a backfilling apparatus for use with a drilling apparatus for planting a plant, in a closed configuration.

In particular, FIGS. 14A to 14C show an example of the backfilling apparatus 1500 in an open configuration, and FIGS. 15A to 15D and 16 show the backfilling apparatus in a closed configuration.

When in the open configuration, the soil guide 1501 is not guiding or moving soil. When the soil guide is moved into the closed configuration, the soil guide moves or guides soil towards at least one of the plant and the hole.

The guiding actuator 1504 is configured to move the backfilling apparatus 1500 between the open and closed configuration. As will be appreciated, any suitable guiding actuator 1504 for moving the soil guide 1501 such that it guides the soil, may be used. It will also be appreciated that the guiding actuator 1504 may be supported or configured in any suitable manner.

An example of a compacting apparatus 1500 for use with a drilling apparatus 200 for planting a plant will now be described with reference to FIGS. 14A to 16. The compacting apparatus 1500 includes a soil compactor 1507, wherein in use the soil compactor 1507 is operable to compress the soil at least partially around the plant and/or in the hole in which it is planted by the drilling apparatus.

In an example, the soil compactor 1507 includes a compacting member 1508 adapted to compact the soil at least partially around the plant and/or in the hole, wherein the compacting member 1508 is moveable to compress the soil. In an example, the compacting member includes a flat surface.

In an example, the compacting apparatus 1500 includes a compacting actuator 240 operable to move the soil compactor 1507.

In use, the soil compactor is moved downwards such that it make impact with the soil and compress it in situ after backfilling the hole in which the plant is planted.

In the preferred form such as that shown in FIGS. 14A to 16, the compacting apparatus 1500 and backfilling apparatus 1500 are integrally formed and are operable as a single unit. In this example, they form a single backfilling and compacting apparatus 1500.

The guide member 1502 and compacting member 1508 are integrally formed including a first wall 1502 adapted to guide the soil in use, and a second wall 1508 adapted to compact the soil in use. The first wall 1502 is substantially upright in the closed configuration, and the second wall 1508 is substantially horizontal in the closed configuration. The integrally formed member 1509 is connected to the at least one arm 1503 according to any one of the examples/ embodiments described herein.

In the preferred form, opposing integrally formed members 1509 are connected to opposing arms 1503.

In the preferred form, the compacting actuator is the displacement actuator 240 according to any of the examples described herein. The displacement actuator 240 is operable to displace the drill head 210 and move the soil compactor 1507 and compacting member 1508 to make impact with the soil and compress it.

In other examples, the drilling apparatus 200 of any one of the embodiments described herein includes a separate backfilling apparatus 1500 and soil compacting apparatus 1500. For example the backfilling apparatus 1500 and soil compacting apparatus 1500 are configured and supported differently. Therefore, it will be appreciated that some embodiments may be without one or the other of the backfilling apparatus 1500 and compacting apparatus 1500.

In an example, the drilling apparatus 200 of any one of the embodiments described herein includes a compacting apparatus 1500 and/or a backfilling apparatus 1500 of any one of the embodiments described herein.

An example of a system and method for planting a plurality of plants will now be described with reference to FIGS. 10A to 11B.

In this example, the system 800 includes a vehicle 700 including a dispensing apparatus 700 for storing and dispensing a plurality of plants according to any of the examples described herein. In addition, the vehicle 700 includes a drilling apparatus 200 according to any of the examples discussed herein. In use, the vehicle 700 is operable to selectively position the drilling apparatus 200, the dispensing apparatus 701 is operable to selectively dispense a plant to the drilling apparatus 200, and the drilling apparatus 200 is operable to drill a hole and release the plant to thereby plant the plant.

Typically, the vehicle 700 and/or system 800 is at least partially autonomous, and in some instances is autonomous. This is particularly advantageous as it means a plurality of plants can be planted in remote or hazardous regions without the need to endanger or engage human labour. Moreover, employment of the system 800 and vehicle 700 means planting is more consistent and accurate than human labour, as people can get physically tired, be inconsistent in their planting, and the like.

In some examples, the system 800 is configured to deliver water and/or fertiliser to either the planted plant and/or the hole. For example, a water or fertiliser reservoir may be mounted to the vehicle, with a delivery mechanism provided into the guide 260 of the drilling apparatus 200. In this regard, the system 800 is able to deliver water and/or fertiliser directly into the hole or onto the planted plant via the channel in the drill head 210. Advantageously this reduces wastage via inaccurate delivery, wind on or the like.

In one example, the system 800 includes the backfilling apparatus 1500 according to any one of the embodiments described herein.

Additionally, or alternatively, the system includes the compacting apparatus 1500 according to any one of the embodiments described herein.

A method of planting a plurality of plants will now be described with reference to any of the systems 800 described in the abovementioned example. In particular, the method includes operating the vehicle 700 to selectively position the drilling apparatus for drilling a plurality of holes. This may be achieved in any suitable manner, including remote control or through augmented navigation (with some human operator intervention) using global positioning system (GPS) hardware and/or software. Alternatively, the vehicle 700 and system 800 may be fully autonomous using, for example, a combination of GPS hardware, software, cameras and sensors. This will be described in more detail below.

The method also includes operating the drilling apparatus 200 to drill the holes at respective positions, and operating the drilling apparatus 200 to open the drill head 210 in respective holes to release the plurality of plants.

Beneficially, the abovementioned methods mean a plurality of plants are able to be planted with little or no intervention from an operator, in remote and/or hazardous regions.

A number of further features will now be described.

Figure 11A:
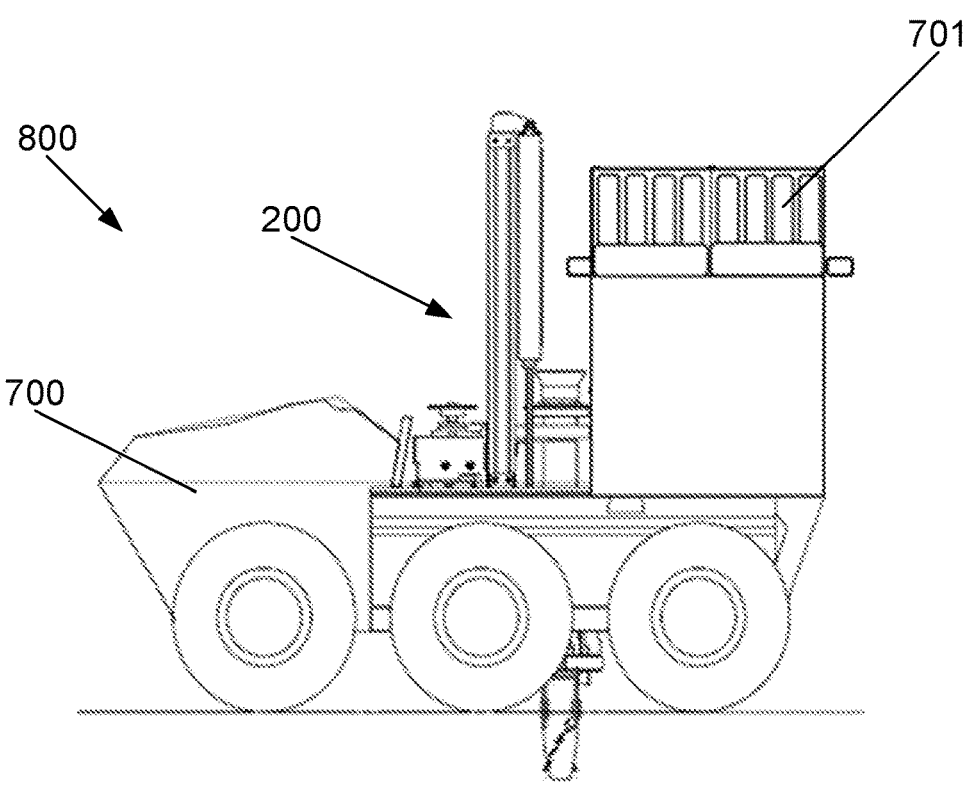
FIGS. 11A and 11B are schematic diagrams of an example of a system for use in planting a plurality of plants, in use.
Figure 11B:
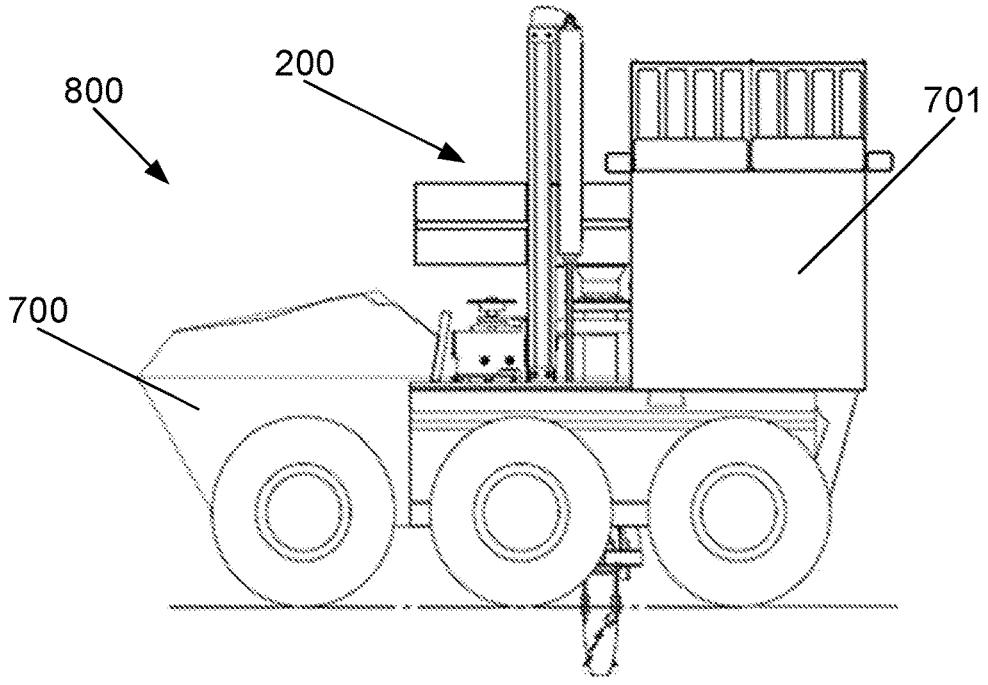

The example of FIG. 11A shows the system including the dispensing apparatus actuator retracted, and in FIG. 11B the system shows the dispensing apparatus actuator extended to release the plant into the guide 260 of the drilling apparatus 200.

In one example, navigation in an augmented and/or autonomous manner may be provided by determining a digital map of the site or landscape to be planted. The digital map may be obtained in any suitable manner, including via satellite, drone, or the like. Navigation software, for example, uploads the digital map and acquires a plurality of waypoints in relation to the digital map such that the waypoints correspond to desired planting positions. Waypoints can be acquired in any suitable manner including via operator input, planting optimization algorithms, or the like. In some instances, the method further includes determining an optimal route between waypoints, for example, in order to increase fuel efficiency or the like.

In another example, the method includes selectively dispensing a plant to the drilling apparatus from a dispensing apparatus that includes a plurality of plants. For example, the dispensing apparatus of any of the examples herein may be mounted to the vehicle 700, such that the dispensing apparatus includes a plurality of plants.

In one instance, the method includes operating the drilling apparatus 200 to retract the open drill head from respective holes. As discussed above, this is particularly advantageous as the retracting drill head allows the soil to settle around the planted plant without the need for backfilling soil or the like.

Additionally, or alternatively, the method includes operating the drilling apparatus to extend the open drill head over the planted plants to thereby embed the planted plants. For example, this can be beneficial in compacting the soil around a newly planted plant in order to ensure optimal soil contact with the planted plant.

In one example, the method includes delivering at least one of water and fertiliser to the plurality of plants. As mentioned above, this can be done via a reservoir mounted on the vehicle, and can further promote plant growth and increase the chance of plant survival to adulthood.

In one example, the method includes guiding soil towards the plurality of plants. This may include operating the backfilling apparatus according to any one of the embodiments described herein.

Additionally, or alternatively, the method includes compacting soil at least partially around the plurality of plants. This may include operating the compacting apparatus according to any one of the embodiments described herein.

In a further example, the method includes planting the plants in apparatus for supporting plants, such as describe in any of the examples herein. Advantageously the protection offered by the sleeve 120 can increase plant survival rates by protecting infant plants from destruction and damage. In some instances, the method also includes nurturing plants, for example from seed or seedling, in the growing compartment 110 of the apparatus 100 for supporting the plant.

The method also includes loading the plurality of plants into the dispensing apparatus of the system 800. This may be achieved in any suitable manner, including manual loading of one or multiple plants at a time.

Figure 10A:
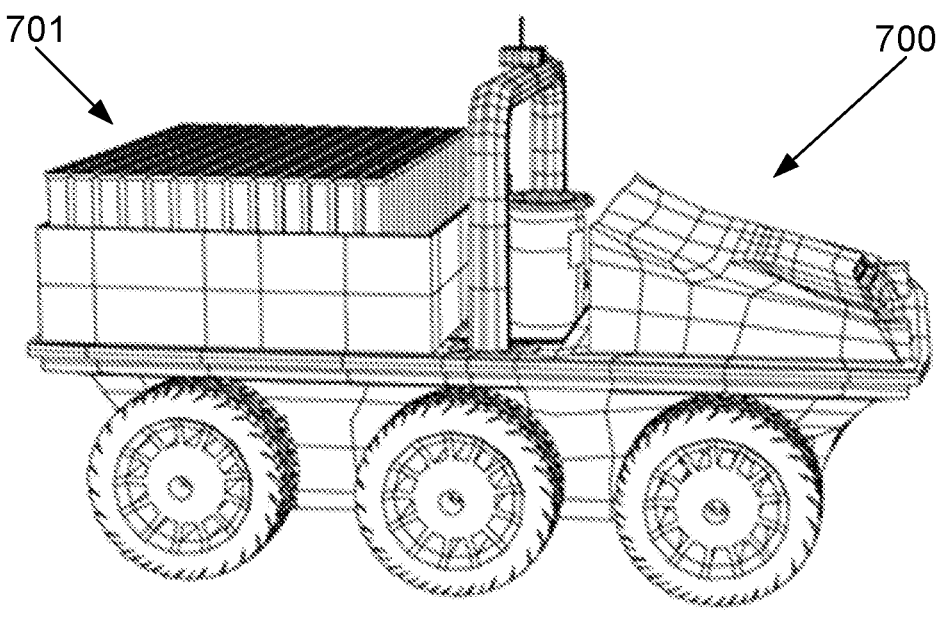
FIGS. 10A and 10B are schematic diagrams of an example of a vehicle for use in planting plants.
Figure 10B:
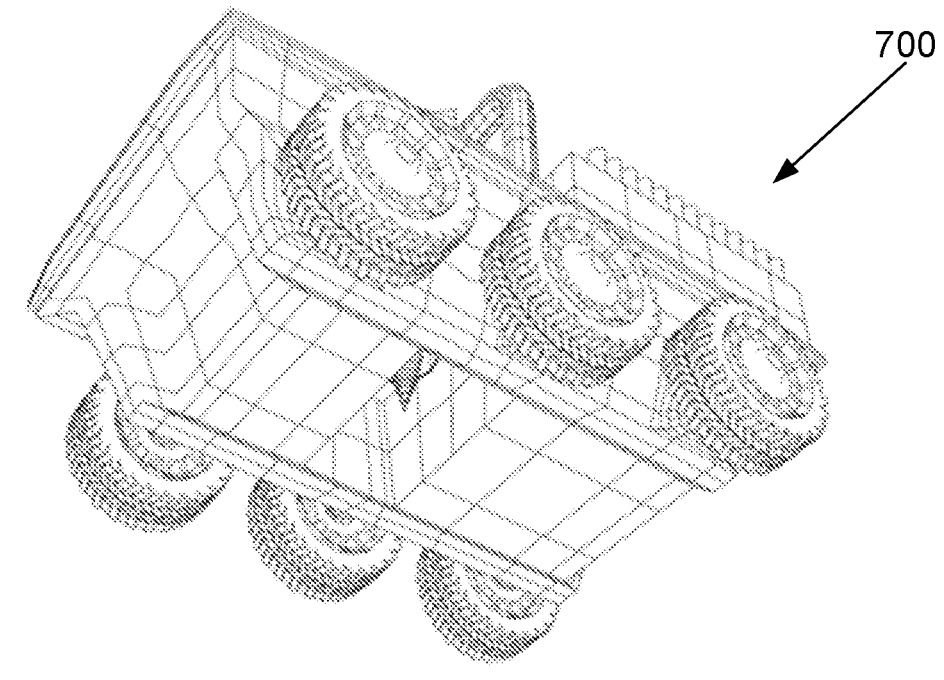

The vehicle 700 of FIGS. 10A and 10B may be any suitable vehicle 700 for performing any of the methods described above. In one example, the vehicle is suitable to transport an appropriate number of plants, for example in a dispensing apparatus. Additionally, the vehicle is typically capable of maneuvering through rough and uneven terrain, usually in a lightweight manner in order to minimize soil compaction issues which can occur with heavy machinery.

Example 1: Opening Drill Planting Apparatus

In this example, an automated planting drill mechanism that acts to both break up hard soil by drilling and then positions or plants a payload is described. Advantageously, this approach to planting is fast, accurate and requires little effort.

In this example, the drill unit includes:

A motor to provide a rotation motion for the drill tube to perform the drilling operation. The type of motor is not specified and the motor can be any one of hydraulic, electric, petrol or gas motor (non-specific), or the like;

A drill chute is where plants are loaded into the apparatus;

The drill barrel that allows the plant to drop down. The drill barrel provides a passage and means for the tubestock/plants to be positioned within the clamshell drill head. The drill tube also provide passage for water or fertiliser to be delivered to a locus, directly onto the plant's position;

Actuators to move the drill tube up and down. Actuators to open and close the clamshell drill head when required;

Bearings to keep the drill tube in place; and,

A clamshell drill head to rip the grass, break up the soil and provide an opening for the tubestock or plant to be precisely positioned whilst the drill head is still in the ground.

In use, the drill unit includes:

A motor that turns or spins the drill unit.

The spinning drill unit is lowered using an actuator.

The clamshell drill head (initially closed) penetrates the ground resulting in the soil being broken up and the hole being dug as the drill head turns.

The clamshell drill head opens up allowing the payload (the plant or an apparatus for supporting a plant— referred to according to some examples as a treetube) to be deployed into the hole made by the clamshell drill head.

The drill unit is retrieved upwards whilst the drill head is open leaving the payload behind standing upright. Soil falls downward around the payload as the drill unit is retrieved.

The drill head can then be re-lowered which performs a compacting motion that pushes the soil around the payload. In this manner the ground is 'firmed down' allowing the payload to be secured in the ground firmly and this ensures optimal root/soil contact.

Example 2: Biodegradable Delivery Mechanism for Planting

Additionally, prior to planting out, 'tubestock' or plants are usually grown in plastic pots and these pots end up in landfills as waste and therefore have negative environmental implications.

During the early stages of a plant's life, whilst the plant is initially establishing its roots, trunks, branches and leaves, the plant is highly susceptible to being predated on by animals or accidentally destroyed by humans. To prevent the plant being destroyed, tree guards or plant protectors may be used. However, these are typically made from plastics, metals or other non-biodegradable materials, which when left become waste where they can negatively impact the environment.

Further, when soil has been degraded over time by human induced activities, the soil often requires nutrients to make any newly planted plants grow strong, healthy and survive.

In this example, a biodegradable delivery mechanism or 'payload' for planting (also referred to as "treetube") is described. The treetube consists of four parts (1) a biodegradable 'outer tree guard' that acts to protect the plant whilst it is being planted, protects the plant for approximately 12 months post planting and acts to hold a special biodegradable pot or liner in its inner, (2) the inner biodegradable pot or inner liner which is positioned inside and at the base of the treetube acts to house the plant and its roots, soil and a nutrient package, (3) a plant which can be any plant species and any shape and size of plant as long as it fits inside the treetube and (4) a nutrient package, which can be modified depending on the plants requirements and/or soil remediation requirements and acts to ensure plant survival and maximum plant growth.

These four components are combined into one package named here as a treetube which allows for a beneficial delivery mechanism for planting. The combination of the four components into the mechanism acts to achieve easy planting using any of the systems or processes herein, and advantageously achieves higher survival rates during and post planting and assists to achieve better overall plant growth.

Higher plant survival rates are achieved by the outer tree guard component of the treetube protecting the plant both during planting and post planting. The outer tree guard component breaks down after approximately 12 months in the outdoor environment, forming a natural, biodegraded mulch, which acts to reduce soil moisture loss through evaporation and helps to promote healthy microorganism activity which ultimately achieves better plant growth.

The inner biodegradable pot or liner acts to hold the plant, its roots, soil and a nutrient package or any added fertilisers or soil remediators. The inner biodegradable pot is also designed to prevent the plant and contents from falling through or out of the treetube. Because the inner biodegradable pot is made of materials that effectively hold moisture, for example, but not limited to, being made from Coir, peat, woodchip or paper pulp, the inner pot enhances the ability for plant roots to access moisture which is beneficial to plant growth.

In this example, the inner biodegradable pot biodegrades faster than the outer tree guard component allowing the plants roots to grow into the ground soil that surrounds the planted treetube. After the inner pot biodegrades the outer tree guard remains standing upright for approximately 12 months, protecting the plant from being destroyed, trampled or eaten by animals.

Unlike the plastics that Tree Guards use in commercial applications are typically made from, treetubes in this example are composed of natural or biodegradable materials, which mitigates risks to the environment or biodiversity.

Example 3: Plant Storage and Delivery Compartment (Hopper) to Store and Deliver Plants to Planting Mechanism The logistics of moving a plant from an on-site location to being planted safely in the ground requires multiple manual operations. Currently the main method involves having a person unload plants from a vehicle or trailer driven along the area to be planted. Holes are then dug either manually using a spade or post-hole digger. Plants are then manually lifted and positioned in a dug hole and soil compacted on top. This is a tough manual task that requires manual strength and repetitive operations that can lead to strain and injury. The 'hopper' described herein streamlines the planting process by providing a storage compartment to house multiple plants safely and securely and the hopper acts to ensure the correct delivery of the young plants or treetubes occurs.

In particular, the method in this example includes:
(1) Delivery Unit to deliver tree to the planting mechanism.
(2) Actuator Unit controlling XY pick and place, or conveyor belt under the tube holders.
(3) Hopper container. Special trays that transform standard tubestock to the hopper array holders are used to position the plants in the hopper reducing the manual process of filling the hopper.
(4) Tubestock without treetube.
(5) Tubestock in treetube.
(6) Tubestock compartments.
(7) The hopper can also be interchanged with a drum magazine arrangement with the actuator pulling through the treetubes one by one, akin to a drum magazine in an automatic gun.
(8) treetubes connected by link material that can be removed, cut or use biodegradable links to separate the treetubes. treetubes can be pulled through to the delivery unit using an actuator unit, rather than an XY gantry or conveyor system.

Example 4: Method and System for Autonomous Planting

Often precision planting systems are too large, too heavy, too slow, require exhaustive manual labour and/or are too costly run for some planting projects. Problems with existing planting systems include that they require a human operator which in some situations can be unsafe for the person(s) involved. Large heavy machinery acts to compact and degrade soil structure over the long term which can impact the ability to grow plants. The planting systems that require heavy or larger machinery are usually expensive to run (fuel costs), require larger areas to turn and, because of their size they can have a larger impact than smaller vehicles on the environment.

In this example, the planting system does not require a human operator onboard which mitigates safety risks to onboard persons. The system is relatively lightweight which means it does not compact the soil like other systems that use heavy machinery. The system is relatively small, reducing its environmental impact. It is fast, it is automatic in the way that it plants and it requires less labour which saves on costs. Because the system is automated it requires far less effort which is more desirable when planting.

In this example, the system includes:
Supplied biodegradable inner pots;
Once the plants and their biodegradable pots have reached the desired size, they are transferred into treetubes that are arrayed in trays. At this point the Nutrient Package can be added to the treetubes to maximise growth. This process is usually done at the plant nursery;
Trays of treetubes with the plants and nutrient packages inside are watered and delivered to the planting site.
The trays with treetubes are loaded onto an unmanned ground vehicle fitted with the above-mentioned drilling apparatus and carrying a load of treetubes in a 'hopper' navigates to the planting location.
The System navigates and plants either through being (1) remote controlled or (2) through 'augmented navigation' using a GPS hardware and software, or, can be set up to navigate (3) fully 'autonomously' using a combination of GPS hardware, sensors, cameras and software.
The software can be programmed so that when the System is operated in a remote-controlled manner at the flick of a switch or the press of a button on the remote controls the drilling apparatus will plant a treetube or plant where the System is located.
For both augmented and autonomous navigation, initially a digital map of the site or landscape to be planted is obtained. The map is obtained by using drone imagery or by using an existing digital map. The digital map is uploaded and overlaid using navigation software. The navigation software is encoded in such a manner that waypoints can be placed on the digital map and that waypoints will correspond with GPS locations in the real world. Wherever a waypoint is placed on the digital map the hardware will plant trees at the corresponding GPS waypoint location out in the field. As the vehicle is following or navigating along the path set in the navigation software the hardware plants the treetubes or plants using the drilling apparatus at the real locations that correspond with the GPS waypoints in the navigation software.
The system of this example includes:
The ability to carry and maintain a quantity of tubestock for planting.
The ability to drill and break up soil, and plant the tubestock precisely, onto a locus.
The ability to fertilise and/or water the plant before or after planting.
The ability to compact the dirt around the plant using the drill head while open.
The ability to move in rough and uneven terrain in a lightweight manner without causing soil compaction issues seen with other heavier planting machinery.

The ability to precision plant in the following three automated manners: (1) remote controlled, (2) through augmented navigation and (3) autonomously.

The system of this example may further include:

The ability to backfill the drilled hole using the backfilling apparatus.

The ability to compact the dirt around the plant using the compacting apparatus.

Accordingly, the above describes an apparatus for supporting a plant for planting, a drill head for planting a plant, a drilling apparatus for planting a plant, a dispensing apparatus for storage and dispensation of a plurality of plants, a backfilling apparatus for use with a drilling apparatus for planting a plant, a compacting apparatus for use with a drilling apparatus for planting a plant, a backfilling and compacting apparatus for use with a drilling apparatus for planting a plant, and a system and method for planting a plurality of plants. Advantageously the various examples have numerous benefits including, for example, increasing the efficiency of planting, ensuring higher plant survival rates, reducing manual labour, and the like.

Throughout this specification and the claims which follow, unless the context request otherwise, the word "comprise", and variations such as "comprises" and "comprising", will be understood to imply the inclusion of a stated integer or step or group of integers of steps but not to the exclusion of any other integer or step or group of integers.

Persons skilled in the art will appreciate that numerous variations and modifications will become apparent. All such variations and modifications which become apparent to persons skilled in the art, should be considered to fall within the spirit and scope that the invention broadly appearing before described.

Thus, for example, it will be appreciated that features from different examples above may be used interchangeably where appropriate.

The invention claimed is:

1. A drill head for planting a plant, the drill head comprising a channel for receiving the plant, and opposing jaws at an end of the channel, the opposing jaws forming a clamshell closing the channel at one end and openable to release the plant from the channel, wherein an outer surface of each of the jaws comprises a plurality of protrusions configured for agitating during drilling, wherein in use, the drill head is:

operable to rotationally drill a hole; and, openable to release the plant from the channel into the hole, to thereby plant the plant.

2. The drill head of claim 1, wherein the channel is axially aligned with the drill head.

3. The drill head of claim 2, wherein the channel is co-axial with the drill head.

4. The drill head of claim 1, wherein the drill head defines a drill end and a plant receiving end, wherein the channel extends from the drill end to the plant end.

5. The drill head of claim 4, wherein the opposing jaws are at the drill end.

6. The drill head of claim 5, wherein the opposing jaws are closeable to define an edge.

7. The drill head of claim 1, wherein an outer surface of the drill head defines an auger.

8. The drill head of claim 1, wherein the protrusions are helically arranged about an axis of the drill head, to thereby assist during drilling.

9. The drill head of claim 1, further comprising a cutter.

10. The drill head of claim 9, wherein the cutter comprises at least one blade.

11. The drill head of claim 9, wherein the cutter extends away from an axis of the drill head.

12. The drill head of claim 9, wherein the cutter is arranged relative to the drill head such that when in use the cutter remains above an opening of the hole.

13. A drilling apparatus for planting a plant, the drilling apparatus comprising:

a frame, the frame supporting:

the drill head of claim 1;

a motor operable to rotate the drill head; and, a displacement actuator operable to displace the drill head.

14. The drilling apparatus of claim 13, wherein the frame supports an opening actuator operable to open the drill head.

15. The drilling apparatus of claim 13, further comprising the cutter of claim 10, wherein the cutter is provided to a rotating part of drilling apparatus other than the drill head.

16. The drilling apparatus of claim 13, wherein the frame supports a plant guide configured to guide the plant into the channel of the drill head for planting.

17. The drilling apparatus of claim 13, wherein the drilling apparatus comprises a backfilling apparatus comprising a soil guide, wherein in use the soil guide is operable to guide soil towards the plant which is planted by the drilling apparatus.

18. The drilling apparatus of claim 13, wherein the drilling apparatus comprises a compacting apparatus comprising a soil compactor, wherein in use the soil compactor is operable to compress the soil at least partially around the plant which is planted by the drilling apparatus.

* * * * *